(12) United States Patent
Wang et al.

(10) Patent No.: US 11,488,389 B2
(45) Date of Patent: Nov. 1, 2022

(54) VERIFYING TIMING OF SENSORS USED IN AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Shuai Wang, Beijing (CN); Manjiang Zhang, Sunnyvale, CA (US); Yaoming Shen, Milpitas, CA (US); Xiangfei Zhou, Sunnyvale, CA (US); Lingchang Li, Beijing (CN); Xianfei Li, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 315 days.

(21) Appl. No.: 16/494,738

(22) PCT Filed: Aug. 30, 2019

(86) PCT No.: PCT/CN2019/103811
§ 371 (c)(1),
(2) Date: Sep. 16, 2019

(87) PCT Pub. No.: WO2021/035722
PCT Pub. Date: Mar. 4, 2021

(65) Prior Publication Data
US 2021/0383133 A1    Dec. 9, 2021

(51) Int. Cl.
*G06V 20/56*    (2022.01)
*B60W 60/00*    (2020.01)
(Continued)

(52) U.S. Cl.
CPC .......... *G06V 20/56* (2022.01); *B60W 50/045* (2013.01); *B60W 60/00* (2020.02); *G01S 7/40* (2013.01);
(Continued)

(58) Field of Classification Search
CPC .... G01S 7/40; G06K 9/00791; B60W 50/045; B60W 60/00; B60W 2400/00;
(Continued)

(56) References Cited

U.S. PATENT DOCUMENTS 5,945,942 A    8/1999   Artis et al.
6,313,741 B1  11/2001   Glabe
(Continued)

FOREIGN PATENT DOCUMENTS

CN    108445808    8/2018
CN    109194436    1/2019
(Continued)

*Primary Examiner* — Peter M Bythrow
*Assistant Examiner* — Alexander L. Syrkin
(74) *Attorney, Agent, or Firm* — Womble Bond Dickinson (US) LLP

(57) ABSTRACT

In some implementations, a method of verifying operation of a sensor is provided. The method includes causing a sensor to obtain sensor data at a first time, wherein the sensor obtains the sensor data by emitting waves towards a detector. The method also includes determining that the detector has detected the waves at a second time. The method further includes receiving the sensor data from the sensor at a third time. The method further includes verifying operation of the sensor based on at least one of the first time, the second time, or the third time.

20 Claims, 17 Drawing Sheets

(51) Int. Cl.
*B60W 50/04* (2006.01)
*G01S 7/40* (2006.01)

(52) U.S. Cl.
CPC ..... *B60W 2400/00* (2013.01); *B60W 2420/42* (2013.01); *B60W 2420/52* (2013.01); *B60W 2554/4041* (2020.02); *B60W 2556/25* (2020.02)

(58) Field of Classification Search
CPC ......... B60W 2420/42; B60W 2420/52; B60W 2554/4041; B60W 2556/25
USPC .......................................................... 342/173
See application file for complete search history.

(56) References Cited

U.S. PATENT DOCUMENTS

| | | | | |
|---|---|---|---|---|
| 6,400,308 | B1* | 6/2002 | Bell | H01Q 1/3233 |
| | | | | 342/71 |
| 7,358,892 | B2* | 4/2008 | Thome | G01S 7/288 |
| | | | | 342/174 |
| 8,872,674 | B1* | 10/2014 | Subramanya | G08G 1/14 |
| | | | | 340/933 |
| 10,404,261 | B1* | 9/2019 | Josefsberg | H03L 7/113 |
| 2008/0252895 | A1 | 10/2008 | Schneider et al. | |
| 2015/0241553 | A1* | 8/2015 | Gehrels | G01S 7/4004 |
| | | | | 342/173 |
| 2015/0260851 | A1* | 9/2015 | Orr | G01S 19/41 |
| | | | | 342/20 |
| 2015/0310281 | A1* | 10/2015 | Zhu | G06K 9/00805 |
| | | | | 382/104 |
| 2016/0003938 | A1* | 1/2016 | Gazit | G01S 13/02 |
| | | | | 342/81 |
| 2017/0269601 | A1 | 9/2017 | Jones | |
| 2017/0273161 | A1* | 9/2017 | Nakamura | G02B 26/105 |
| 2018/0017672 | A1 | 1/2018 | Warke et al. | |
| 2018/0046183 | A1* | 2/2018 | Peters | G01S 17/931 |
| 2019/0236058 | A1* | 8/2019 | Komala | G06F 16/2477 |
| 2019/0277962 | A1* | 9/2019 | Ingram | G01S 7/4013 |

FOREIGN PATENT DOCUMENTS

| | | | | |
|---|---|---|---|---|
| CN | 109194436 | A | | 1/2019 |
| CN | 109271880 | | | 1/2019 |
| CN | 109450582 | | | 3/2019 |
| CN | 109462454 | | | 3/2019 |
| CN | 109725572 | | | 5/2019 |
| CN | 109743128 | | | 5/2019 |
| CN | 109743128 | A | * | 5/2019 |
| CN | 109743128 | A | | 5/2019 |
| CN | 109815555 | A | | 5/2019 |
| CN | 109952600 | A | | 6/2019 |
| EP | 2818889 | A2 | * | 12/2014 ........... G01S 13/931 |
| EP | 3413080 | A1 | | 12/2018 |

* cited by examiner

VERIFYING TIMING OF SENSORS USED IN AUTONOMOUS DRIVING VEHICLES

CROSS-REFERENCE TO RELATED APPLICATION

This patent application is a U.S. National Phase Application under 35 U.S.C. § 371 of International Application No. PCT/CN2019/103811, filed Aug. 30, 2019, entitled "VERIFYING TIMING OF SENSORS USED IN AUTONOMOUS DRIVING VEHICLES," which is incorporated by reference herein in its entirety.

TECHNICAL FIELD

Embodiments of the present disclosure relate generally to operating autonomous vehicles. More particularly, embodiments of the disclosure relate to verifying the operation of sensors used in autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. A path describes the geometric shape of the movement for autonomous driving vehicles. An autonomous driving vehicle may use various sensors to detect objects in the environment where the autonomous driving vehicle is located. The autonomous driving vehicle may determine a path through the environment based on the objects that are detected.

SUMMARY

According to a first aspect, an embodiment of the disclosure provides a method, including: causing a sensor to obtain sensor data at a first time, wherein the sensor obtains the sensor data by emitting waves towards a detector; determining that the detector has detected the waves at a second time; receiving the sensor data from the sensor at a third time; and verifying operation of the sensor based on at least one of the first time, the second time, or the third time, wherein the sensor is utilized to sense a driving environment during autonomous driving of an autonomous driving vehicle.

According to a second aspect, an embodiment of the disclosure provides a method, including: causing a sensor to obtain sensor data at a first time, wherein: the sensor obtains the sensor data by detecting waves; and the sensor is unable to generate the waves that are detected by the sensor; generating a stimulus for the sensor to detect at a second time; receiving the sensor data from the sensor at a third time; and verifying operation of the sensor based on at least one of the first time, the second time, or the third time, wherein the sensor is utilized to sense a driving environment during autonomous driving of an autonomous driving vehicle.

According to a third aspect, an embodiment of the disclosure provides a non-transitory machine-readable medium having instructions stored therein, which when executed by a processor, cause the processor to perform operations, the operations including: causing a sensor to obtain sensor data at a first time, wherein the sensor obtains the sensor data by emitting waves towards a detector; determining that the detector has detected the waves at a second time; receiving the sensor data from the sensor at a third time; and verifying operation of the sensor based on at least one of the first time, the second time, or the third time.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Some embodiments relate to a method, apparatus, and system for synchronizing sensors of autonomous driving vehicle (ADV). As discussed above, an ADV may use various sensors to detect objects in the environment where the ADV is located and/or travelling. If the sensors are not synchronized, the sensors may not capture, obtain, record, sensor data simultaneously or at the same time. This may make it more difficult for the ADV to correlate and/or use the sensor data from the sensors. For example, it may be more difficult for the ADV to determine whether an object detected by one sensor is the same as an object detected by a second sensor. Thus if may be useful to synchronize the sensors such that the sensors are capturing and/or obtaining sensor data at the same time (e.g., simultaneously).

Figure 1:
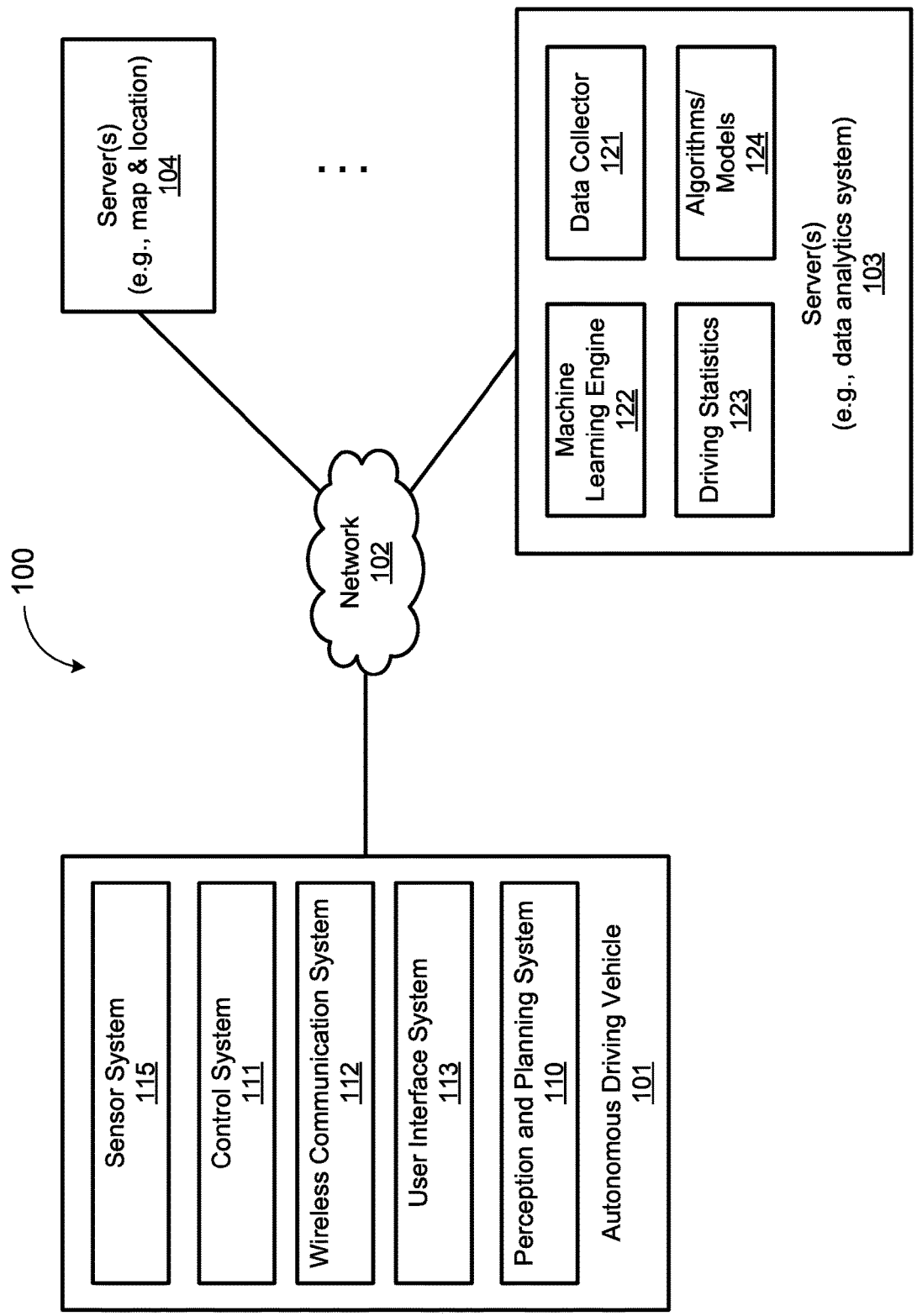
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. Hereinafter the terms "autonomous vehicle" and "autonomous driving vehicle" (ADV) may be used interchangeably.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
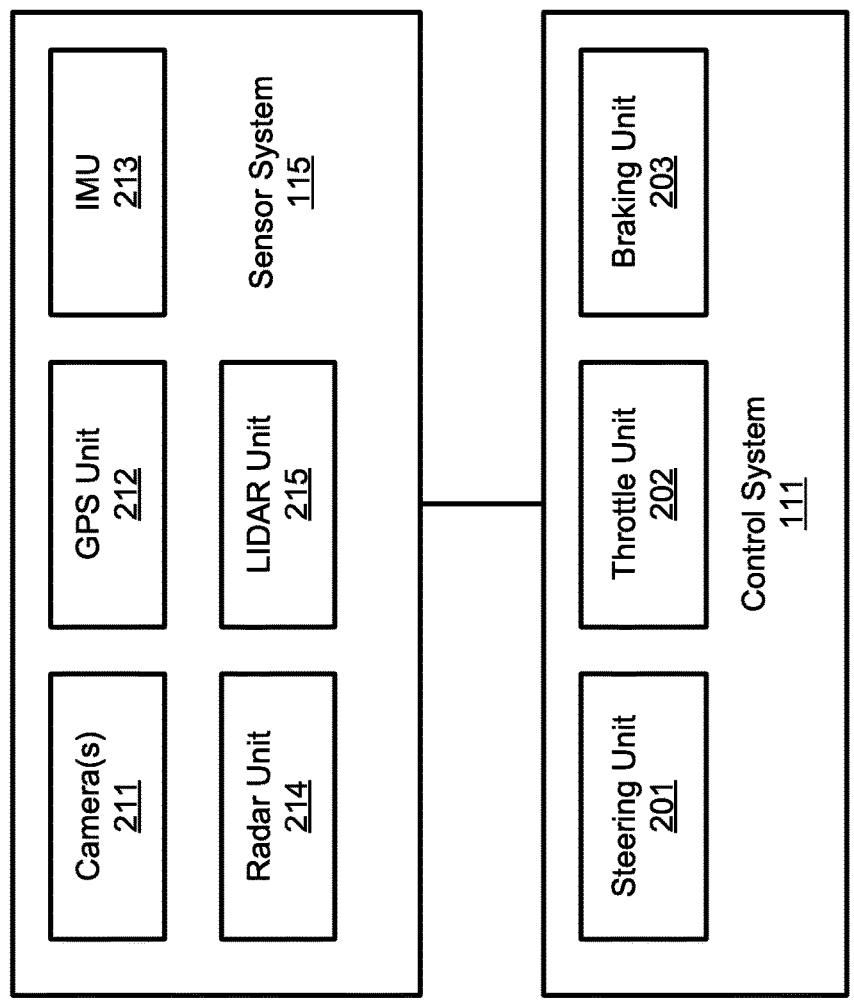
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan a path or a route, and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a path algorithm that receives inputs, constraints, and a cost function, and generates a path for the ADV, taking into account the comfort level associated with the path as well as the preference for the path to stay close to the lane center line and away from obstacles with a buffer. A cost function for the path planning may also be generated as a part of algorithms 124. Algorithms 124 can then be uploaded on ADVs to be utilized during autonomous driving in real-time.

Figure 3A:
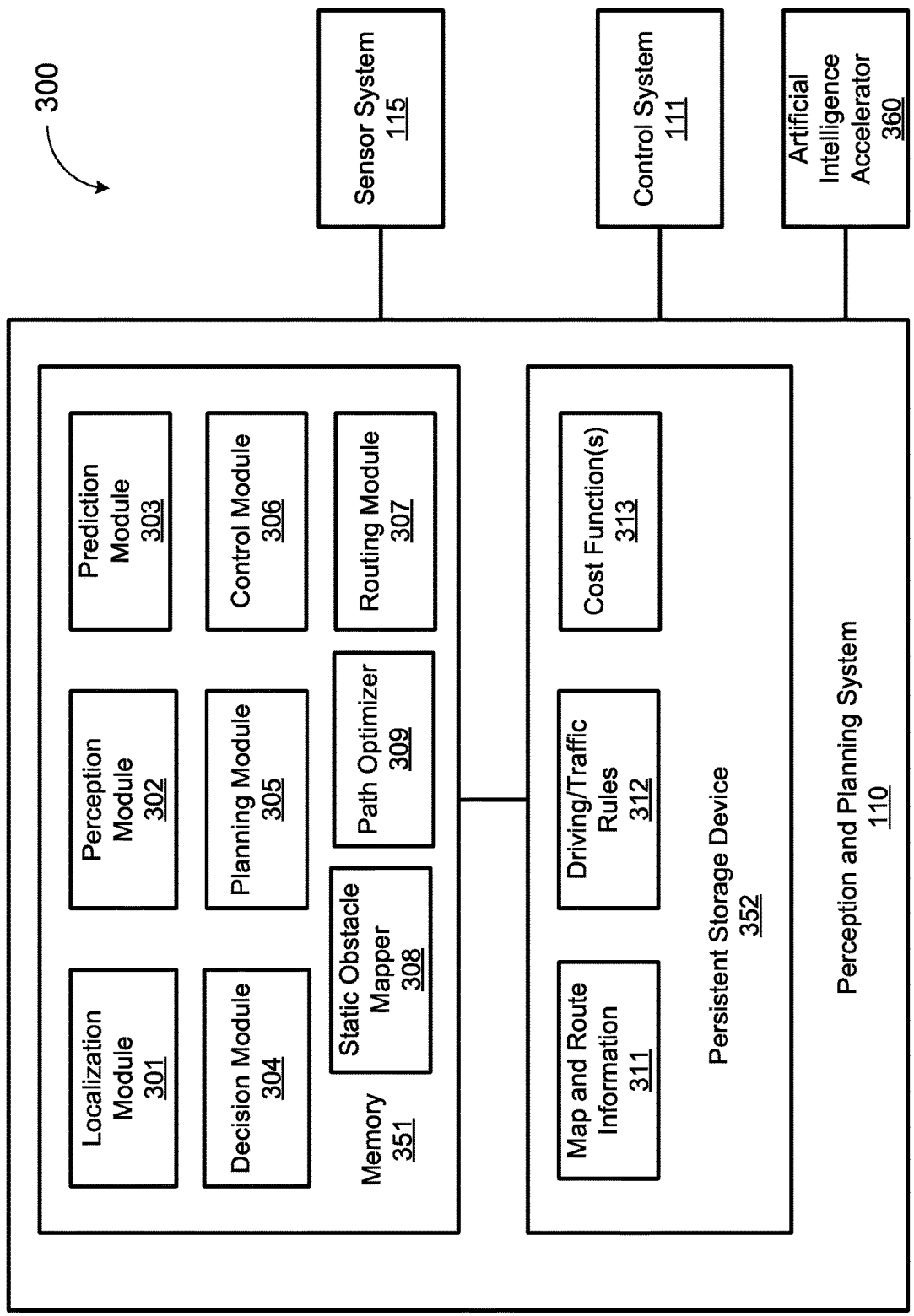
FIGS. 3A-3B are block diagrams illustrating an example of a perception and planning system used with an autonomous vehicle according to one embodiment.
Figure 3B:
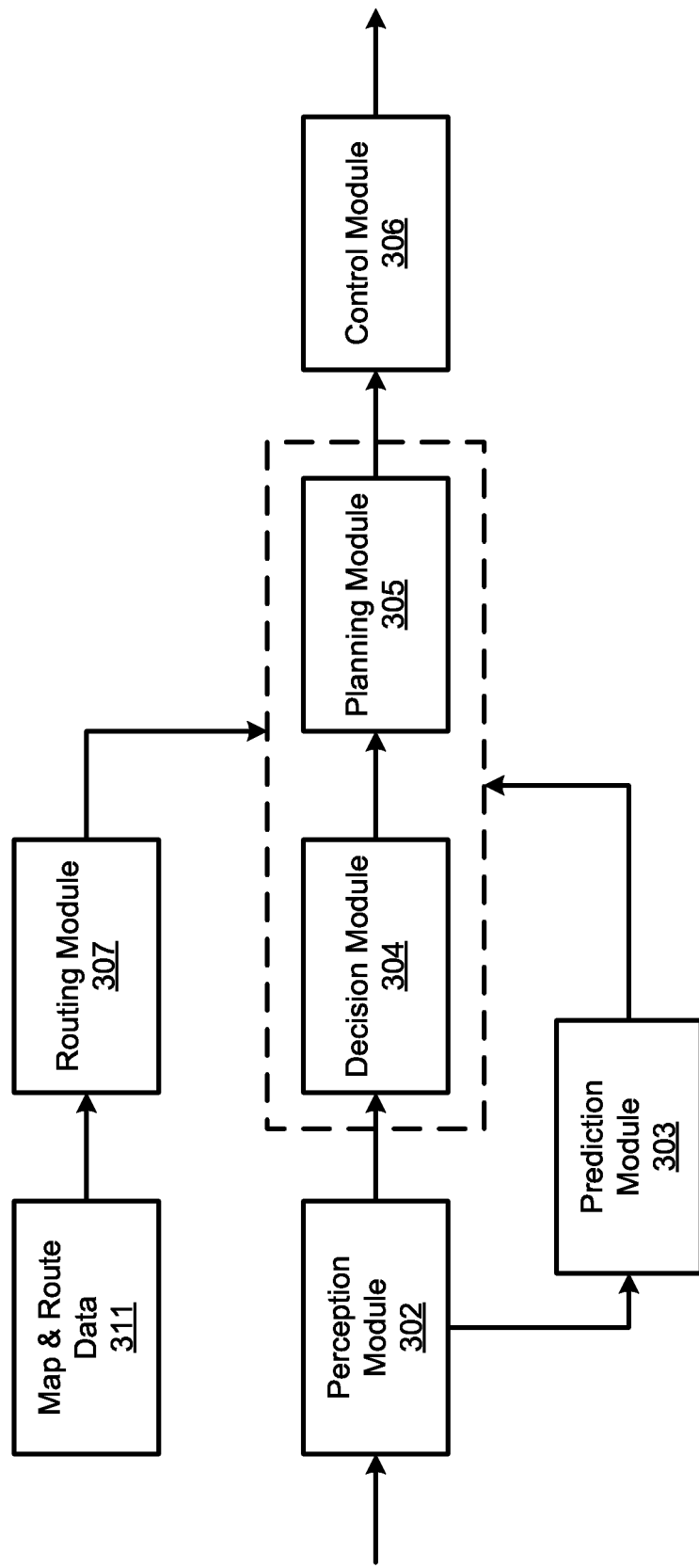

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, static obstacle mapper 308, path planner 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

As part of the planning process, the path planner 309 may generate a plurality of planned ADV states based on a cost function 313, which may be stored in persistent storage device 352.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, paths are planned in an SL-coordinate system. The SL-coordinate system may be defined relative to the reference line (road/lane center line). The longitudinal distance, or s-distance, represents the distance along the tangential direction of the reference line. Correspondingly, the lateral distance, or l-distance, represents the distance perpendicular to the s-direction. The longitudinal dimension in the SL space represents a longitudinal distance of a particular object from a current location of the vehicle that is presumably drives along the reference line. The lateral dimension in the SL space represents the shortest distance between the object and the reference line at a particular time or location represented by the longitudinal dimension. Such a graph in the SL space is referred to as an SL graph. In one embodiment, the lateral distance may be simply defined as the distance from the reference line. Therefore, in addition to representation in the Cartesian coordinate system (XY plane), a vehicle position (pose) may be represented in the SL-coordinate system as an ordered pair (longitudinal pose/position "s-pose", lateral pose/position "l-pose"), or simply (s, l), with respect to a reference line.

In some embodiments, one or more of the components of the perception and planning system 110 may include and/or may use one or more neural networks. For example, the planning module 305 may include and/or may use one or more neural networks to perform various tasks, functions, operations, actions, etc. In another example, the prediction module 302 may include and/or may use one or more neural networks to perform various tasks, functions, operations, actions, etc. In one embodiment, the one or more neural networks that may be included in and/or may be used by one or more components of the perception system may detect lanes (e.g., road lanes) in images that are captured and/or generated by sensors of the ADV. For example, a neural network that is used by the perception module 302 may determine line indicators that may indicate lanes of a road in an image.

As illustrated in FIG. 3A, the system 300 includes an artificial intelligence (AI) accelerator 360. The AI accelerator 360 may be a processing device that may designed, customized, and/or configured for artificial intelligence applications. For example, the AI accelerator may be used to accelerate the operation of artificial neural networks, to perform machine vision and/or machine learning operations, etc. Examples of AI accelerators may include graphics processing units (GPUs), application specific integrated circuits, field programmable gate arrays, etc.

Figure 4A:
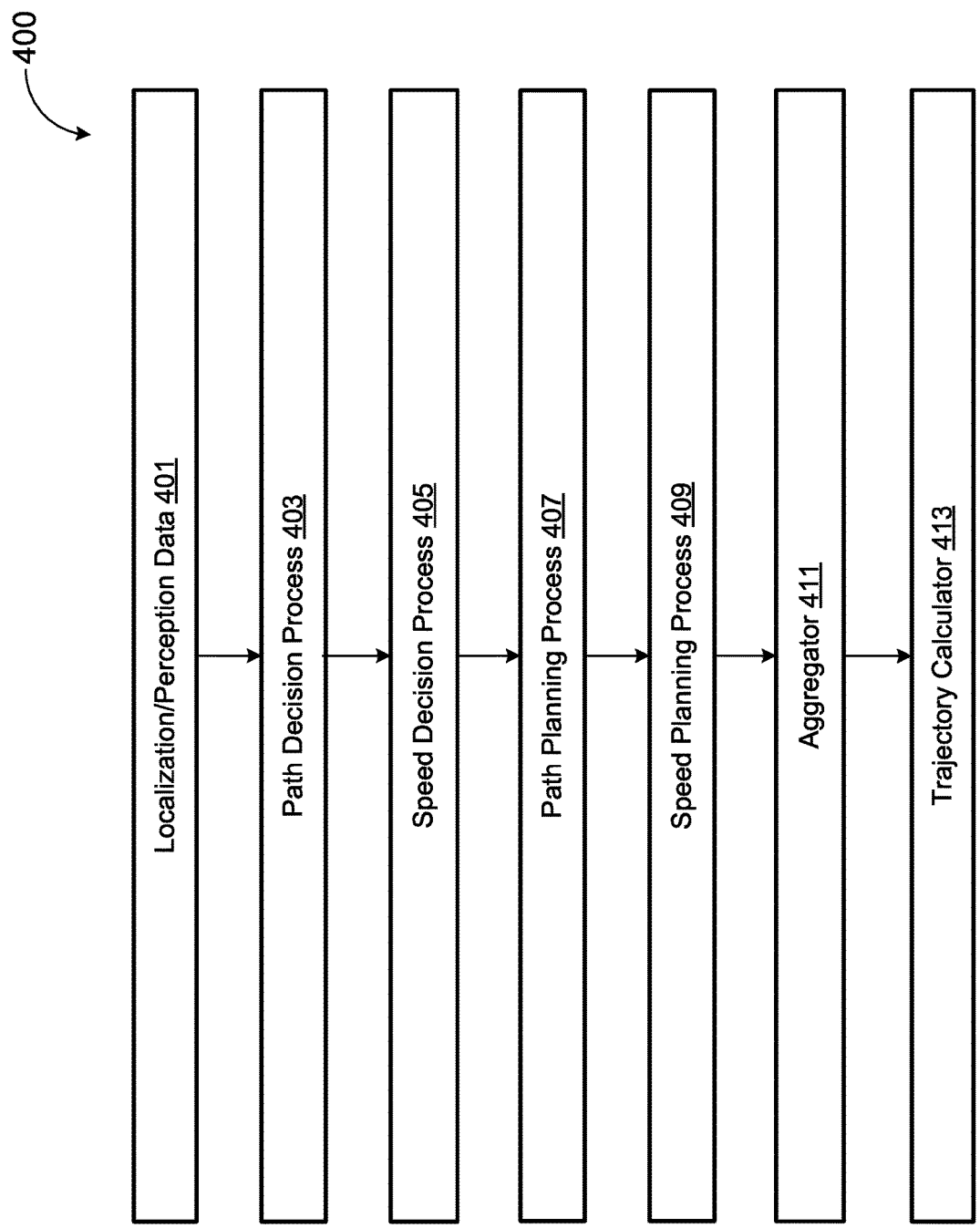
FIG. 4A is a block diagram illustrating an example of a decision and planning process according to one embodiment.

FIG. 4A is a block diagram illustrating an example of a decision and planning process 400 according to one embodiment. Decision and planning process 400 includes localization/perception data 401, path decision process 403, speed decision process 405, path planning process 407, speed planning process 409, aggregator 411, and trajectory calculator 413.

Path decision process 403 and speed decision process 405 may be performed by decision module 304 illustrated in FIG. 3B. Referring to FIG. 3B, the decision module 304 may generate a rough path profile as an initial constraint for the path/speed planning processes 407 and 409 using dynamic programming. The decision module 304 may use a path state machine that provides previous planning results and important information such as whether the ADV is cruising or changing lanes, and traffic rules. From the states, traffic rules, reference line provided by routing module 307, and obstacles perceived by the ADV, path decision process 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time. Dynamic programming (or dynamic optimization) may be a mathematical optimization method that breaks down a problem to be solved into a sequence of value functions, solving each of these value functions just once and storing their solutions. The next time the same value function occurs, the previous computed solution is simply looked up saving computation time instead of re-computing its solution.

Speed decision process 405 may use a speed state machine, speed traffic rules, and one or more station-time graphs. Speed decision process 405 can generate a rough speed profile as an initial constraint for the path/speed planning processes 407 and 409 using dynamic programming. From a state of the speed state machine, speed traffic rules, rough path profile generated by decision process 403, and perceived obstacles, speed decision process 405 can generate a rough speed profile to control when to speed up and/or slow down the ADV.

Path planning process 407 may use may use a rough path profile (e.g., a station-lateral map) as the initial constraint to recalculate an optimal reference line using quadratic programming. Quadratic programming involves minimizing or maximizing an objective function (e.g., a quadratic function with several variables) subject to bounds, linear equality, and/or inequality constraints. One difference between dynamic programming and quadratic programming is that quadratic programming optimizes all candidate movements for all points on the reference line at once. The path planning process 407 may apply a smoothing algorithm (such as B-spline or regression) to the output station-lateral map. Path costs may be used to recalculate a reference line with a path cost function to optimize a total cost for candidate movements for reference points, for example, using quadratic programming (QP) optimization.

Speed planning process 409 may use a rough speed profile (e.g., a station-time graph) and one or more S-T graphs to determine one or more speeds for the ADV. In some embodiments, the S-T graph may include an S-T trajectory. An S-T trajectory may indicate the distance travelled by the ADV along the path at different points in time, as discussed in more detail below. Thus, the S-T trajectory (of the S-T graph) maybe used to indicate or determine the speed of the car at different points in time. The S-T graph may also include or indicate one or more stop conditions. For example, the S-T graph may also indicate distances and times at which the ADV should stop to avoid an obstacle, such as a pedestrian, a sidewalk, a roadway divider (e.g., a center divide), another vehicle, etc. Although an ST-graph may be described in FIG. 4, other types of graphs (e.g. SL graphs, graphs that use Cartesian coordinate systems, etc.) may be used in other embodiments. The speed planning process 409 may also use one or more constraints to determine one or more speeds for the ADV. A constraint may be one or more conditions that should be satisfied when the speed planning process 409 determines the set of speeds. For example, a constraint may be a condition imposed on the QP optimization problem which candidate solutions should satisfy. The one or more constraints may be represented using a speed constraint function, as discussed in more detail below.

Aggregator 411 performs the function of aggregating the path and speed planning results. For example, in one embodiment, aggregator 411 can combine the two-dimensional S-T graph and S-L map into a three-dimensional SLT graph. In another embodiment, aggregator 411 can interpolate (or fill in additional points) based on 2 consecutive points on a S-L reference line or S-T curve. In another embodiment, aggregator 411 can translate reference points from (S, L) coordinates to (x, y) coordinates. Trajectory generator 413 can calculate the final trajectory to control the ADV. For example, based on the SLT graph provided by aggregator 411, trajectory generator 413 calculates a list of (x, y, T) points indicating at what time should the ADC pass a particular (x, y) coordinate.

Thus, referring back to FIG. 4, path decision process 403 and speed decision process 405 are to generate a rough path profile and a rough speed profile taking into consideration obstacles and/or traffic conditions. Given all the path and speed decisions regarding the obstacles, path planning process 407 and speed planning process 409 are to optimize the rough path profile and the speed profile in view of the obstacles using QP programming to generate an optimal trajectory with minimum path cost and/or speed cost.

Figure 4B:
FIG. 4B is a block diagram illustrating system architecture for autonomous driving according to one embodiment.

FIG. 4B is a block diagram illustrating system architecture 450 for autonomous driving according to one embodiment. System architecture 450 may represent the system architecture of an autonomous driving system as shown in FIGS. 3A and 3B. Referring to FIG. 4B, system architecture 450 includes, but it is not limited to, application layer 451, planning and control (PNC) layer 452, perception layer 453, driver layer 454, firmware layer 455, and hardware layer 456. Application layer 451 may include user interface or configuration application that interacts with users or passengers of an autonomous driving vehicle, such as, for example, functionalities associated with user interface system 113. PNC layer 452 may include functionalities of at least planning module 305 and control module 306. Perception layer 453 may include functionalities of at least perception module 302. In one embodiment, there is an additional layer including the functionalities of prediction module 303 and/or decision module 304. Alternatively, such functionalities may be included in PNC layer 452 and/or perception layer 453. System architecture 450 further includes driver layer 454, firmware layer 455, and hardware layer 456. Firmware layer 455 may represent at least the functionality of sensor system 115, which may be implemented in a form of a field programmable gate array (FPGA). Hardware layer 456 may represent the hardware of the autonomous driving vehicle such as control system 111 and/or sensor system 115. Layers 451-453 can communicate with firmware layer 455 and hardware layer 456 via device driver layer 454.

Figure 5:
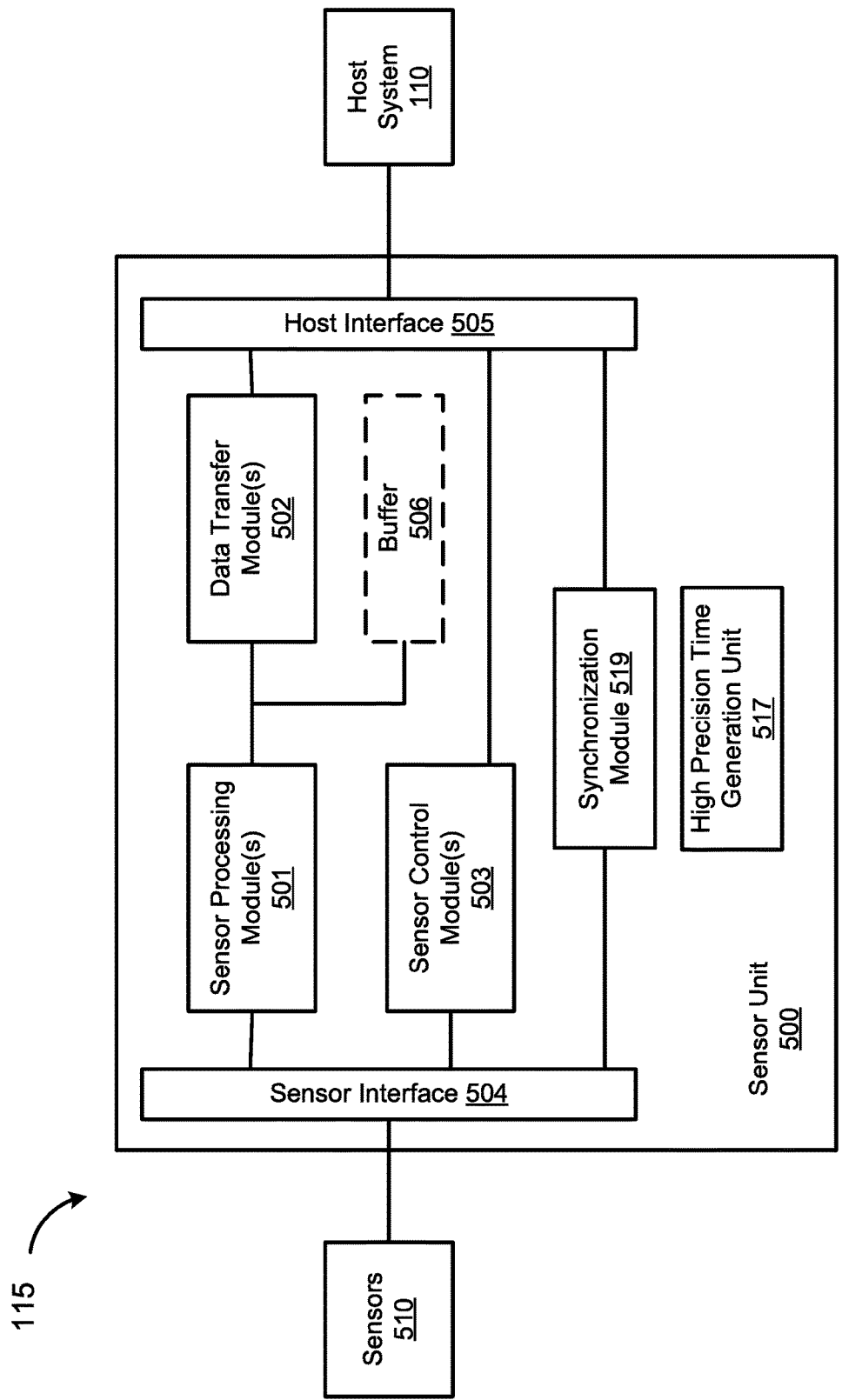
FIG. 5 is a block diagram illustrating an example of a sensor unit according to one embodiment.

FIG. 5 is a block diagram illustrating an example of a sensor system according to one embodiment of the invention. Referring to FIG. 5, sensor system 115 includes a number of sensors 510 and a sensor unit 500 coupled to host system 110. Host system 110 represents a planning and control system as described above, which may include at least some of the modules as shown in FIGS. 3A and 3B. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel includes a specific sensor processing module and a specific data transfer module that have been configured or programmed to handle the corresponding sensor data and protocol.

In one embodiment, sensor unit 500 includes high precision time generation circuit 517. High precision time generation circuit 517 can generate a time and/or a timestamp to be used by each of sensors 510 to keep track of when sensor data are transmitted or captured/triggered by each of sensors 510, and/or received by sensor unit 500, as shown in FIGS. 6A-6B.

The sensor system 115 also includes a synchronization module 519. In embodiment the synchronization module 519 may synchronize data acquisition times of one or more follower sensors to a lead sensor. This may allow the lead sensor and the follower sensors to obtain, record, capture, etc., sensor data at the same time (e.g., simultaneously, at overlapping times, etc.), as discussed in more detail below. If sensors do not capture, obtain, record, sensor data simultaneously or at the same time, it may be more difficult for the ADV to correlate and/or use the sensor data from the sensors S1 and S2. For example, it may be more difficult for the ADV to determine whether an object detected by one sensor is the same as an object detected by a second sensor. In another example, it may be more difficult for the ADV to determine the position of the object if the two sensors are detecting the object at different points in time. In some embodiments, synchronizing the sensors of the ADV may allow the ADV to correlate or more easily correlate different sensor data from different sensors. Correlating sensor data from different sensors may allow the ADV to detect vehicles, objects, obstacles, pedestrians, lanes, etc., in an environment more quickly, efficiently, easily and/or with more accuracy.

Figure 6A:
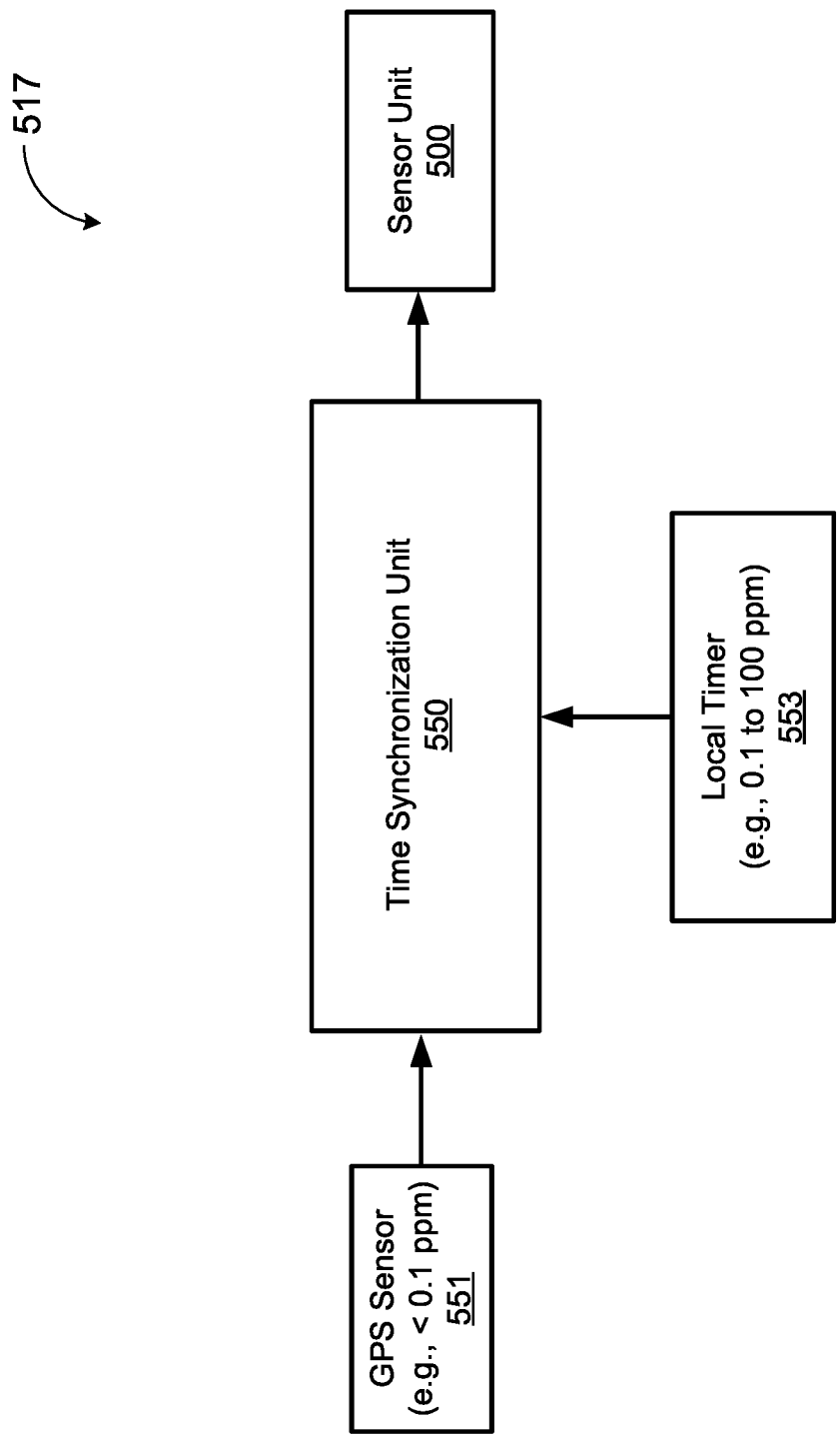
FIG. 6A is a block diagram illustrating an example of a high precision time generation unit according to one embodiment.

Referring now to FIG. 6A, high precision time generation circuit 517 may include time synchronization unit 550, GPS sensor 551, and local timer 553. Time synchronization unit 550 can synchronize local timer 553 with respect to a time derived from a pulse per second (PPS) signal from GPS sensor 551. The PPS can be used to align local timer 553 for precise time measurements, to the nanoseconds. GPS sensor 551 can be part of GPS unit 212 of sensor system 115 of FIG. 2 or GPS sensor 551 can be a dedicated GPS sensor integrated within high precision time generation circuit 517. Local timer 553 can generate a time for sensor unit 500. Local timer 553 can be a timer from any local RTCs (e.g., CPU RTC or FPGA RTC) or sensors of sensor unit 500, or a time retrieved from an external source such as a cellular source, e.g., 4G, long-term evolution (LTE), 5G, a WIFI source, FM receiver, etc.

Figure 6B:
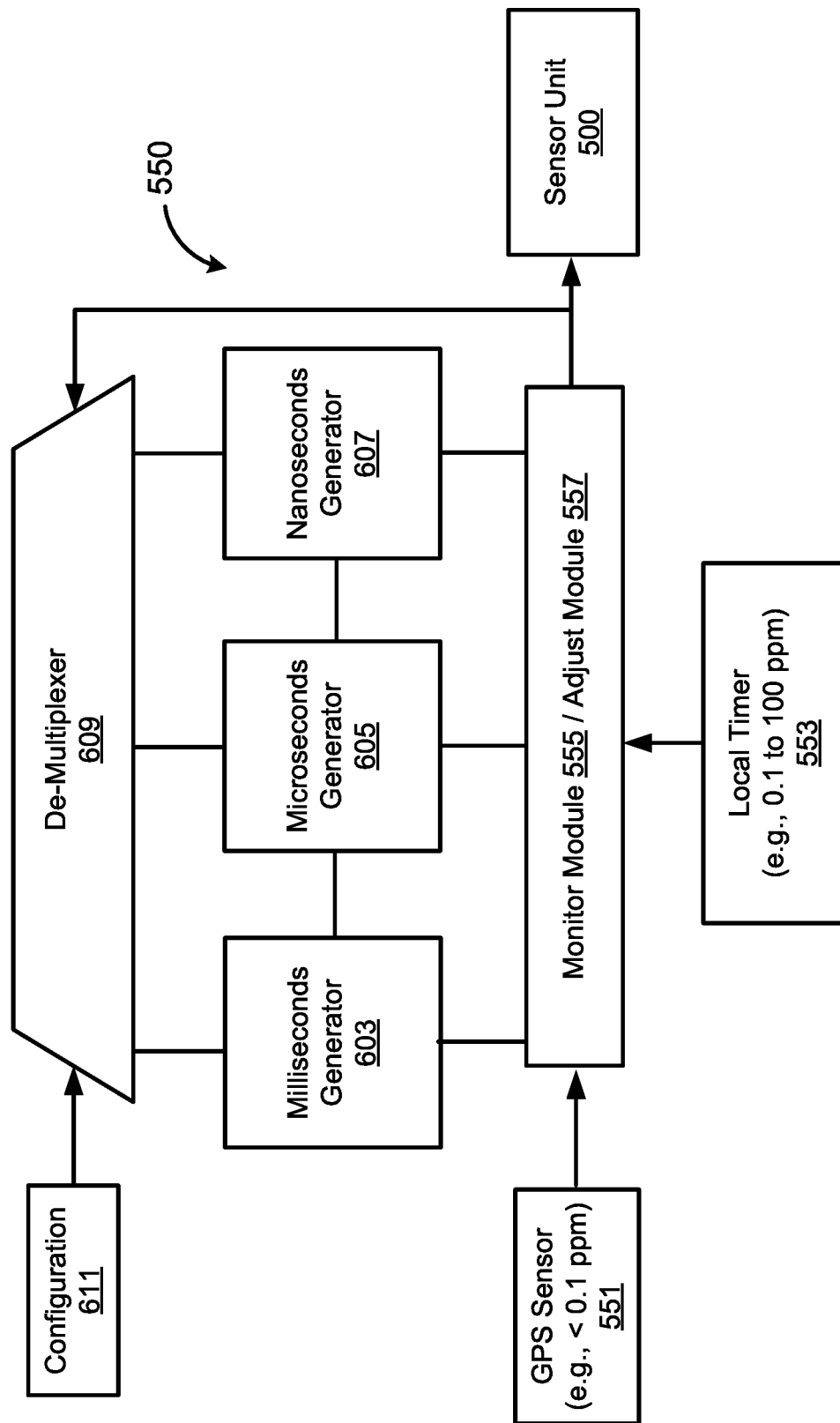
FIG. 6B is a block diagram illustrating an example of a high precision time generation unit with three counter generators according to one embodiment.

Referring to FIG. 6B, time synchronization unit 550 may include monitor module 555, adjust module 557, millisecond generator 603, microsecond generator 605, nanosecond generator 607, de-multiplexer 609, and configuration 611. Millisecond generator 603, microsecond generator 605, and nanosecond generator 607 can generate millisecond, microsecond, and nanosecond oscillation cycles respectively (e.g., oscillator counters at three different granularities) based on an oscillator of local timer 553. Configuration 611 can configure a select signal to select which of the outputs for millisecond generator 603, microsecond generator 605, and nanosecond 607 are to be routed to monitor module 555. Monitor module 555 can monitor the generated oscillation cycles to count these cycles. Adjust module 557 can adjust the counts (or modifies the count representations) so to sync the local timer 553 with a PPS signal from GPS sensor 551. In one embodiment, select signal for configuration 611 can be programmed by a user of sensor unit 500 or by monitor module 555/adjust module 557 in a feedback loop. For example, a user can configure to disable the millisecond generator if it is determined that local timer 553 is relatively precise.

Depending on the type of crystal oscillators used, local timer 553 may have an accuracy ranging from 0.1 to 100 ppm, e.g., any pulse may be off by 0.1 to 100 microseconds, whereas the pulse per second (PPS) signal from GPS sensor 551 has an accuracy rate of less than 0.1 ppm, or less than 0.1 microseconds of deviations for each pulse for each second. For a 0.1 ppm GPS PPS signal, a received PPS signal from GPS sensor 551 may assert consecutive pulses to be between 999,999.9 and 1,000,000.1 microseconds every second, while a typical 100 ppm local timer 553 may assert consecutive pulses to be between 999,900 and 1,000,100 microseconds every second. Furthermore, the variations in deviations of the pulses for local timer 553 may change in real-time due to changes in ambient temperature of the crystal oscillator ICs using by local timer 553. Thus, an objective is to adjust or sync local timer 553 to match GPS sensor 551 in real-time.

To sync local timer 553 to GPS sensor 551, in one embodiment, GPS sensor 551 receives a GPS pulse signal (PPS) that is a RF signal transmitted by a satellite broadcasting its signal in space with a certain accuracy rate, e.g., <0.1 ppm. In some embodiments, GPS sensor 551 receives the PPS signal from a first GPS satellite followed by a PPS signal from a second GPS satellite if the first GPS satellite is out of range. Because GPS satellites use its own precise measure of time with each satellite having its own on-board set of atomic clocks, PPS signals from the GPS satellites can be viewed as one or more reference timers. Note, however, because local timer 553 is adjusted in real-time to match any one GPS PPS signal, it is assumed that any time discrepancies when GPS PPS signals of two or more different GPS satellites are not a concern since the local timer 553 can be synced smoothly in real-time, as described further below.

Once a GPS PPS signal is received, monitor module 555 may determine any offsets of a time of the PPS signal and a time for local timer 553 and may generate a second local real-time clock/timer based on the determined offsets. For example, based on the PPS signal, date and time information (Coordinated Universal Time or UTC format) may initially be provided by GPS (National Marine Electronics Association) NMEA data information, accurate up to the seconds. Next, in one embodiment, milliseconds generator 603 may generate a close-to-one-millisecond oscillation count (e.g., a first granularity) using local timer 553. The close-to-one-millisecond oscillation count may be generated using a frequency divider circuit to divide a signal frequency of the local timer 553. Monitor module 555 may then detect or count a number of cycles (e.g., 999 cycles) from milliseconds generator 603 for a GPS PPS signal time interval of one second, e.g., local timer 553 lags the GPS PPS signal by about one millisecond. Because milliseconds generator 603 lags the GPS PPS, in one embodiment, adjust module 557 adjusts the milliseconds generator output to represent 1.001 milliseconds per oscillation. Milliseconds generator 603 then generates the following 1000 oscillation representations for each second: 0.000, 1.001, 2.002, . . . , 999.999, and 1001 milliseconds. So the 999th cycle from milliseconds generator 603 counts to 999.999 milliseconds.

Next, microseconds generator 605 may generate a close-to-one-microsecond oscillation count using local timer 553. The close-to-one-microsecond oscillation count (e.g., a second granularity) may be generated using a second frequency divider circuit to divide a signal frequency of the local timer 553. Monitor module 555 may count 998 cycles from microseconds generator 605 or a 2 microseconds offset for a GPS PPS time interval of one millisecond. Again, because microseconds generator 605 lags the GPS PPS, adjust module 557 adjusts the microseconds generator output to represent 1.002 microseconds per oscillation. The microseconds generator then generates the following 1000 oscillation representations for each millisecond: 0.000, 1.002, 2.004, ..., 999.996, 1000.998, and 1002 microseconds. So the 998th cycle counts to 999.996 microseconds.

Next, nanoseconds generator 607 may generate a close-to-one-nanosecond oscillation count using local timer 553. The close-to-one-nanosecond oscillation count (e.g., a third granularity) may be generated using a third frequency divider circuit to divide a signal frequency of the local timer 553. Monitor module 555 may count 997 cycles from nanoseconds generator 607 or detect a 3 nanoseconds offset for a GPS PPS signal time interval of one microsecond. Again, adjust module 557 may adjust the nanoseconds generator output to represent 1.003 nanosecond per oscillation. The nanoseconds generator then generates the following 1000 oscillation representations for each microsecond: 0.000, 1.003, 2.006, ..., 999.991, 1000.994, 1001.997, and 1003 nanoseconds. So the 997th cycle from the nanoseconds generator 607 counts to 999.991 nanoseconds. This way, any of the generator outputs (e.g., representations) or a combination thereof, can generate a high precision time in real-time. The high precision time can then be provided to the sensors of sensor unit 500. In the above example, the generated time has a precision up to one nanosecond using the nanoseconds generator. Note, although three generators (e.g., three granularities) are described, any number of generators and granularities may be used to generate a high precision time.

In some embodiment, configuration 611 may selectively enable/disable, via de-multiplexer 609, any of generators 603-607. The selectivity may turn on/off any of the generators. Selectivity is useful to select a subset of the generator outputs (e.g., only nanosecond generator) when only a subset of the outputs is required. In another embodiment, monitor module 555 buffers (e.g., saves) the offsets for the different granularities and maintaining the first, second, and third count values (e.g., value representations per oscillation) if a GPS sensor signal is lost, until the GPS sensor signal is again regained.

Figure 7:
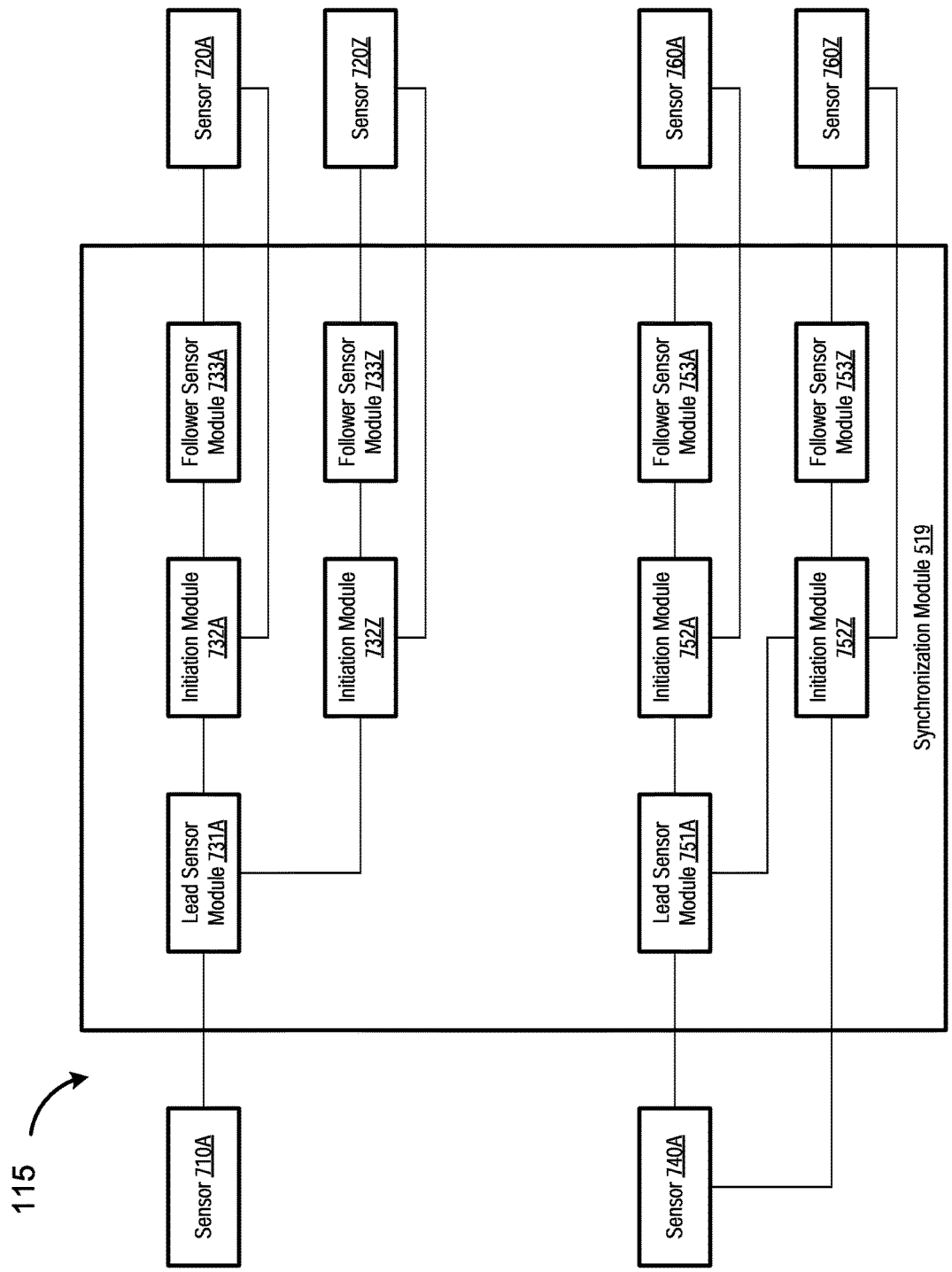
FIG. 7 is a block diagram of an example synchronization module according to one embodiment.

FIG. 7 is a block diagram of an example synchronization module 519 according to one embodiment. The synchronization module 519 may be part of a sensor system 115, as discussed above. The synchronization module 519 may be coupled to sensors 710A, 720A-720Z, 740A, and 760A-760Z via a sensor interface (e.g., sensor interface 504 illustrated in FIG. 5). The sensor interface may include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, PCIe and/or other general purpose input/output (GPIO) interfaces. The sensors 710A, 720A-720Z, 740A, and 760A-760Z may part of an autonomous driving vehicle and may be used by the autonomous driving vehicle to detect what is in the environment where the autonomous driving vehicle is located (e.g., to detect objects, vehicles, pedestrians, cyclists, lanes, buildings, signs, etc.). Examples of sensors may include a camera, a LIDAR device/sensor, a RADAR device sensor, a GPS receiver, an IMU, an ultrasonic device/sensor, a GNSS (global navigation satellite system) receiver sensor, an LTE or cellular SIM card, vehicle sensors (e.g., throttle, brake, steering sensors), and system sensors (e.g., temperature, humidity, pressure sensors), etc.

Sensors 710A and 740A may be lead sensors and sensors 720A-720Z may be follower sensors. A lead sensor may be associated with a set of follower sensors (e.g., one or more flower sensors). A lead sensor may be a sensor that is used to determine when other sensors (such as a set of one or more follower sensors) should record, capture, acquire, obtain, sense, etc., sensor data. For example, the lead sensor may capture or acquire sensor data at a certain time. The set of follower sensors that is associated with the lead sensor may be configured to capture or acquire sensor data at the same time. For example, the lead sensor and the set of follower sensors may capture/acquire sensor data simultaneously. A follower sensor may be associated with a lead sensor (e.g., may be grouped with a lead sensor). A follower sensor may be a sensor that captures/acquires sensor data based on the time that an associated lead sensor captures/acquires sensor data, as discussed above. In different embodiments, any combination and/or any number of lead and/or follower sensors may be used in sensor system 115. For example, the sensors may be organized into different sets, and each set may have one or more lead sensors and one or more follower sensors.

Each sensor may have one or more data acquisition characteristics. Data acquisition characteristics of a sensor may be characteristics, properties, parameters, attributes, functionalities, etc., which may indicate and/or may be used to determine how long it may take for a sensor to capture data. For example, if a sensor is a camera, data acquisition characteristics of the camera may include shutter speed, exposure settings, aperture settings, ISO speed, etc. These data acquisition characteristics may indicate and/or may be used to determine (e.g., calculate) how long it may take for a camera to capture or record an image. In another example, if a sensor is a LIDAR sensor/device, data acquisition characteristics of the LIDAR sensor/device may include the rotation speed of the laser or mirror. The rotation speed may indicate and/or may be used to determine (e.g., calculate) how long it may take for a LIDAR sensor/device to capture LIDAR data.

In one embodiment, a data acquisition characteristic of a sensor may include the amount of time for a sensor to start capturing/obtaining sensor data after the sensor receives an instruction, message, packet, etc., to capture/obtain sensor data. For example, it may take time for a camera to initialize the CCD (charged coupled device) and CMOS (complementary metal-oxide-semiconductor) sensors that are in the camera. In another example, it may take time for a radar device/sensor to power up a transmitter. In a further example, it may take time for a LIDAR device/sensor to power up a laser. The time between receiving the instruction, message, packet, etc., and starting the capture of sensor data may be referred to as an initiation delay for the sensor. In yet another example, it may take time for a laser or mirror to rotate to a certain position/location for a LIDAR device/sensor. The initiation delay may be an example of a data acquisition characteristic for a sensor.

In one embodiment, a data acquisition characteristic of a sensor may include the amount of time it takes for a sensor to capture/obtain sensor data. For example, it may take a camera a certain amount of time for a camera to capture or record an image. In another example, it may take time for a radar sensor/device to perform enough measurements to determine the distance to an object. The amount of time it takes for the sensor to capture, obtain, record, generate, etc., the sensor data may be referred to as an acquisition delay. The acquisition delay may be an example of a data acquisition characteristic for a sensor. The acquisition delay may be based on other data acquisition characteristics of the sensor (e.g., the shutter speed, exposure time, etc., of a camera).

The synchronization module 519 includes lead sensor modules 731A and 751A. In one embodiment, a lead sensor module may determine one or more data acquisition characteristics of a lead sensor. For example, lead sensor module 731A may determine one or more data acquisition characteristics of sensor 710A (e.g., a lead sensor) and lead sensor module 751A may determine one or more data acquisition characteristics of sensor 740A (e.g., a lead sensor). A lead sensor module may determine one or more characteristics of a lead sensor by accessing settings/parameters of the lead sensor, reading a configuration file, querying the lead sensor for data acquisition characteristics (e.g., requesting the data acquisition characteristics from the lead sensor), etc.

The synchronization module 519 also includes follower sensor modules 733A-733Z and 753A-753Z. In one embodiment, a follower sensor module may determine one or more data acquisition characteristics of a follower sensor. For example, follower sensor module 733A may determine one or more data acquisition characteristics of sensor 720A (e.g., a follower sensor). A follower sensor module may determine one or more characteristics of a follower sensor by accessing settings/parameters of the follower sensor, reading a configuration file, querying the follower sensor for data acquisition characteristics (e.g., requesting the data acquisition characteristics from the follower sensor), etc.

The synchronization module 519 also includes initiation modules 732A-732Z and 752A-752Z. In one embodiment, an initiation module may initiate the capture, acquisition, recording, etc., of sensor data. For example, initiation module 732A may transmit a frame, message, packet, instruction, etc., to the sensor 720A to cause the sensor to begin capturing sensor data. The message, packet, instruction, etc., may initiate, trigger, cause, etc., the sensor 720A to capture sensor data. The time that the initiation module transmits the message, packet, instruction, etc., to the sensor (to trigger or cause the sensor to capture sensor data) may be referred to as an initiation time.

In one embodiment, the synchronization module 519 (e.g., a lead sensor module or a follower sensor module) may determine a set of data acquisition characteristics of a lead sensor (e.g., sensor 710A) and a set of follower sensors associated with the lead sensor (e.g., sensors 720A-720Z), as discussed above. The synchronization module 519 (e.g., an initiation module) may synchronize the data acquisition times of a lead sensor (e.g., sensor 710A) and one or more follower sensors (e.g., sensors 720A-720Z), based on the data acquisition characteristics of the lead sensor and one or more follower sensors. For example, the synchronization module 519 may cause the lead sensor to obtain sensor data at a first data acquisition time (e.g., a first time or time period) and may cause a follower sensor to acquire sensor data at a second data acquisition time (e.g. a second time or time period). A data acquisition time may also be referred to as a time period, a time frame, etc., in which a sensor may obtain sensor data. The first data acquisition time first data acquisition time and the second data acquisition time may overlap. For example, the synchronization module 519 may cause the lead sensor and one or more follower sensors (associated with the lead sensor) to obtain data simultaneously (e.g., the time periods for the acquisition delays for the sensors may at least partially overlap).

In one embodiment, synchronization module 519 (e.g., an initiation module) may determine the data acquisition times of the lead sensor and/or one or more follower sensors based on data acquisition characteristics of the lead sensor and/or one or more follower sensors. For example, the synchronization module 519 may determine the data acquisition times of the lead sensor and/or one or more follower sensors based on the initialization delays and/or the acquisition delays of the lead sensor and/or one or more follower sensors, as discussed in more detail below. In one embodiment, the data acquisition time of a sensor may include the acquisition delay and/or may be the same as the acquisition delay (e.g., the data acquisition time is the acquisition delay).

In one embodiment, the synchronization module 519 (e.g., an initiation module) may determine the data acquisition times of the lead sensor and/or one or more follower sensors based on sensor histories of the lead sensor and/or one or more follower sensors. For example, the synchronization module 519 may track, record, etc., the previous initiation delays and acquisition delays for the lead sensor and/or one or more follower sensors. The synchronization module 519 may determine average initiation delays and average acquisition delays for the lead sensor and/or one or more follower sensors. The synchronization module 519 may determine the data acquisition times of the lead sensor and/or one or more follower sensors based on the average initiation delays and the average acquisition delays for the lead sensor and/or one or more follower sensors.

In one embodiment, the synchronization module 519 (e.g., an initiation module) may determine an initiation time for a sensor based a data acquisition time of the sensor. Based on the amount of time for the sensors to capture data and a desired data acquisition time, the synchronization module 519 may determine a when to initiate or trigger the sensor, such that the sensor will capture/obtain sensor at the desired data acquisition time (e.g., during a desired time, time frame, time period, etc.). For example, if the desired data acquisition time for a sensor (to capture/obtain sensor data) is at time T, the synchronization module 519 may determine that the initiation time for the sensor should be T minus the initiation delay for the sensor (and minus a portion or all of the acquisition delay), as discussed in more detail below.

In one embodiment, a lead sensor may be able to support the use initiation times and the one or more follower sensors may be able to support the use of initiation times. For example, the lead sensor and the one or more follower sensors can be triggered to start obtaining sensor data at a specific time (e.g., can be instructed to start obtaining sensor data at a specific time). In another embodiment, a lead sensor may not be able to support the use initiation times and the one or more follower sensors may be able to support the use of initiation times. For example, once the sensor starts obtaining sensor data, the sensor may not be able to adjust the frequency or the timing for capturing sensor data (e.g., the sensor may capture data every 15 milliseconds and may not be able to capture data at different intervals of time). Because the times when the lead sensor may not be triggered or initiated at a certain time, the one or more follower sensors may user the timing of the lead sensor (e.g., the acquisition delays and/or the initiation delays) to determine when the one or more follower sensors should be triggered to start obtaining sensor data.

Figure 8A:
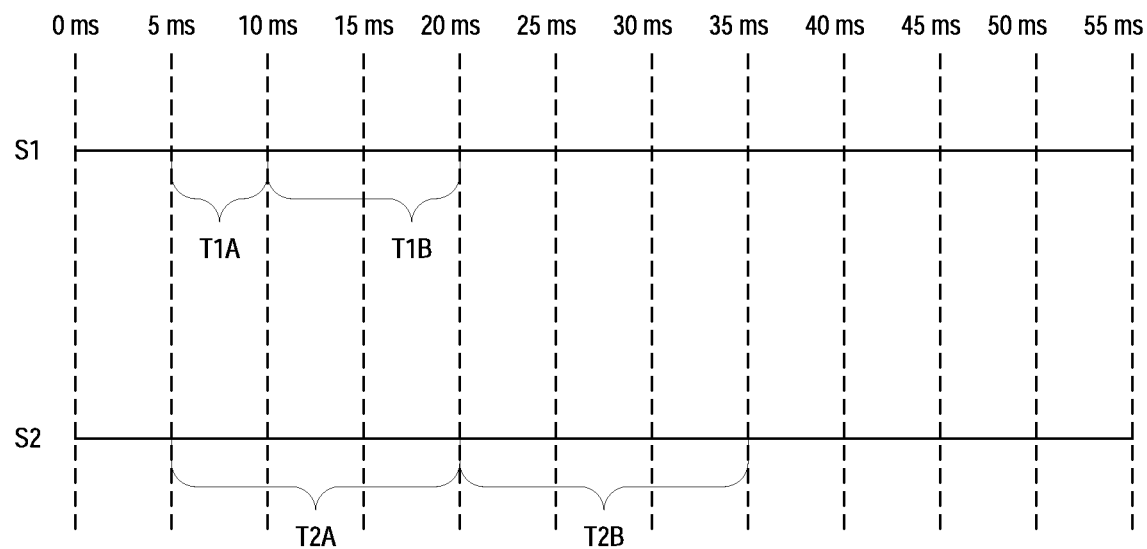
FIG. 8A is graph that illustrates the timing of the operations of two sensors according to one embodiment.

FIG. 8A is graph 800 that illustrates the timing of the operations of two sensors S1 and S2 according to one embodiment. Sensors S1 and S2 may be sensors in an autonomous driving vehicle. For example, sensor S1 may be a camera and sensor S2 may be a LIDAR sensor/device. Sensor S2 may be a lead sensor and sensor S1 may be a follower sensor associated with sensor S2 (e.g., associated with the lead sensor). As discussed above a lead sensor may be a sensor that is used to determine when one or more follower sensors should record, capture, acquire, obtain, sense, etc., sensor data. Sensors S1 and S2 may each have one or more data acquisition characteristics. Data acquisition characteristics of a sensor may be characteristics, properties, parameters, attributes, functionalities, etc., which may indicate and/or may be used to determine how long it may take for a sensor to capture data, as discussed above. For example, the initialization delay and/or the acquisition delay may be data acquisition characteristics of a sensor.

As illustrated in FIG. 8A, sensors S1 and S2 may both be initialized at 5 ms. For example, the sensors S1 and S2 may receive a message, instruction, data, etc., to start capturing, recording, obtaining, etc., sensor data at 5 ms. T1A may be the initialization delay for the sensor S1 and T2A may be the initialization delay of the sensor S2. As discussed above, the initialization delay may be the time it takes for a sensor to start capturing, recording, obtaining, etc., sensor data after receiving the message, instruction, data, etc. T1A represents an initialization delay of 5 ms and T2A represents an initialization delay of 15 ms. T1B may be the acquisition delay for the sensor S1 and T2B may be the acquisition delay of the sensor S2. As discussed above, the acquisition delay may be the amount of time it takes for a sensor to capture sensor data (e.g., the time it takes for a camera to capture and image). T1B represents an acquisition delay of 10 ms and T2B represents an acquisition delay of 15 ms.

As illustrated in FIG. 8, the sensors S1 and S2 may not gather, record, obtain, capture, etc., sensor data simultaneously. For example, sensor S1 is recording/obtaining sensor day during the acquisition delay T1B which starts at 10 ms and ends at 20 ms. Sensor S2 is recording/obtaining sensor day during the acquisition delay T2B which starts at 20 ms and ends at 35 ms. Because the sensors S1 and S2 are capturing/obtaining sensor data at different points in time, they may detect objects in the environment at different times. For example, sensor S1 may detect another vehicle during the T1B and sensor S2 may detect the same vehicle during T2B. However, because the times, time period, time frame, etc., at which the sensors S1 and S2 detect the vehicle do not overlap (e.g., because S1 and S2 are not obtaining/capturing sensor data simultaneously), it may be more difficult for the ADV to correlate and/or use the sensor data from the sensors S1 and S2. For example, sensor S1 may capture an image of a vehicle during T1B. Sensor S2 may detect the distance and/or shape the vehicle during T2B using a laser. However, because sensor S1 captured an image of S1 first and S2 detected the distance to the vehicle afterwards, the vehicle may no longer be in the same position (e.g., may longer be at the same distance away from the ADV) when S2 detects the distance to the vehicle. Thus, it may be harder for the ADV to correlate the sensor data received from the sensors S1 and S2. For example, it may be harder (or may not be possible) for the ADV to determine that the vehicle captured in the image from S1 is the same as the vehicle that is detected by S2.

Figure 8B:
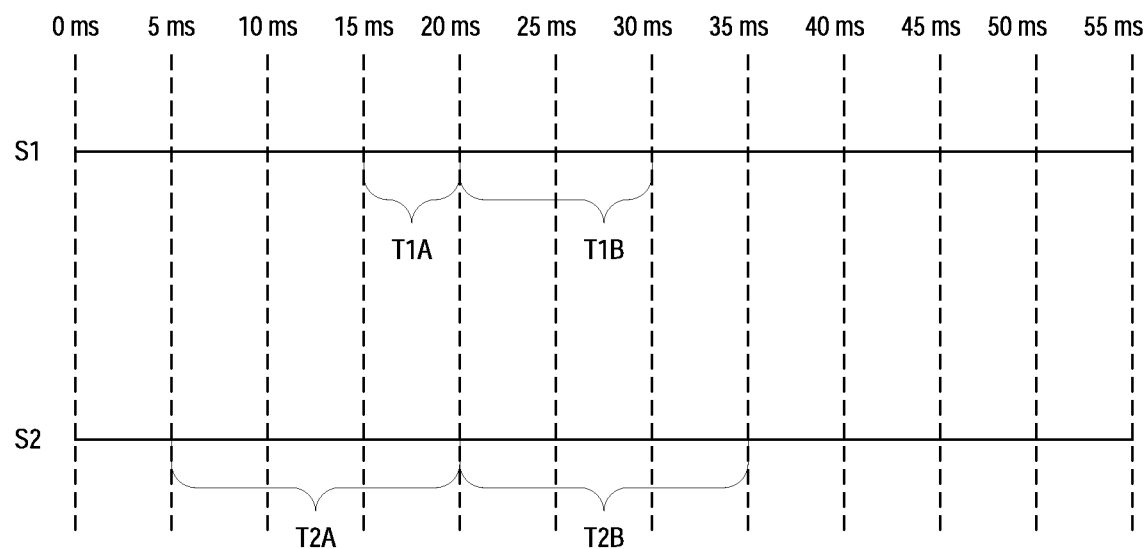
FIG. 8B is graph that illustrates the timing of the operations of two sensors according to one embodiment.

FIG. 8B is graph 800 that illustrates the timing of the operations of two sensors S1 and S2 according to one embodiment. Sensors S1 and S2 may be sensors in an autonomous driving vehicle. Sensor S2 may be a lead sensor and sensor S1 may be a follower sensor associated with sensor S2 (e.g., associated with the lead sensor). As discussed above a lead sensor may be a sensor that is used to determine when one or more follower sensors should record, capture, acquire, obtain, sense, etc., sensor data. Sensors S1 and S2 may each have one or more data acquisition characteristics. Data acquisition characteristics of a sensor may be characteristics, properties, parameters, attributes, functionalities, etc., which may indicate and/or may be used to determine how long it may take for a sensor to capture data, as discussed above.

In one embodiment, the ADV may determine an initialization time for sensors S1 and S2 based on data acquisition characteristics of the sensors S1 and S2. For example, the sensor S1 has an initialization delay of 5 ms and an acquisition delay of 10 ms. The sensor S2 has an initialization delay of 15 ms and an acquisition delay of 15 ms. The ADV may determine the data acquisition times for the sensors S1 and S2 such that the data acquisition times for the sensors S1 and S2 at least partially overlap, or such that the sensors S1 and S2 capture, record, obtain, etc., sensor data simultaneously (e.g., there is at least some overlap between the data acquisition time of S1 and the data acquisition time of S2).

As illustrated in FIG. 8B, the ADV (e.g., synchronization module 519 illustrated in FIGS. 5 and 7) may determine initialization times for the sensors S1 and S2. As discussed above, the initialization times for the sensors S1 and S2 may be times when the sensors S1 and S2 may initiate the recording, capturing, gathering, etc., of sensor data. The initialization time for sensor S1 may be 15 ms and the initialization time for sensor S2 may be 5 ms. Because the initialization delay for sensor S1 is 5 ms and the initialization delay for sensor S2 is 15 ms, the sensor S2 may initialized earlier. This may allow the sensor S1 and S2 to start capture, recording, etc., sensor data at the same time. For example, both sensors S1 and S2 may start capturing, recording, etc., sensor data at the time 20 ms. Thus, the sensors S1 and S2 may be recording, capture, etc., sensor data simultaneously.

In other embodiments, the initiation times and/or the data acquisition times may shift if there is at least some overlap between the data acquisition times of the sensors (e.g., some overlap between the times periods of the acquisition delays of the sensors). For example, the initialization time of the sensor S1 may be at time 20 ms and the acquisition delay T1B may be between 25 ms and 35 ms. This may allow the sensors S1 and S2 to finish capturing, recording, obtaining, etc., at the same time.

As discussed above, it may be difficult for the ADV to correlate sensor data from different sensors when the sensors do not capture, record, obtain, etc., sensor data simultaneously. As illustrated in FIG. 8, the ADV may synchronize the sensors S1 and S2 (e.g., synchronize the operation of the sensors S1 and S2) such that there is at least some overlap in the time periods when the sensors S1 and S2 are capture, recording, obtaining, etc., data. Because the times, time period, time frame, etc., at which the sensors S1 and S2 are obtaining sensor data overlap, this may allow the ADV to more easily correlate the sensor data from both the sensors S1 and S2. For example, sensor S1 may be a camera and may capture an image of a vehicle during T1B. Sensor S2 may be a LIDAR device/sensor and may detect the distance and/or shape the vehicle during T2B using a laser. Because sensor S1 captured an image of S1 first and sensor S2 detected the distance at the same time, the ADV may determine that the vehicle detected by the sensor S2 (using the laser) is the same of the vehicle in the image generated by sensor S1.

In some embodiments, correlating sensor data from different sensors may allow the ADV to detect vehicles, objects, obstacles, pedestrians, lanes, etc., in an environment more easily and/or with more accuracy. For example, if both a camera and a LIDAR device/sensor detect a vehicle at the same time, the ADV may be able to correlate the sensor data more easily and may be more confident that there is an object in the environment. In another example, the ADV may be able to more easily determine the location, speed, and/or heading of an object in the environment if the ADV is able to correlate the sensor data from multiple sensors more easily.

Figure 9:
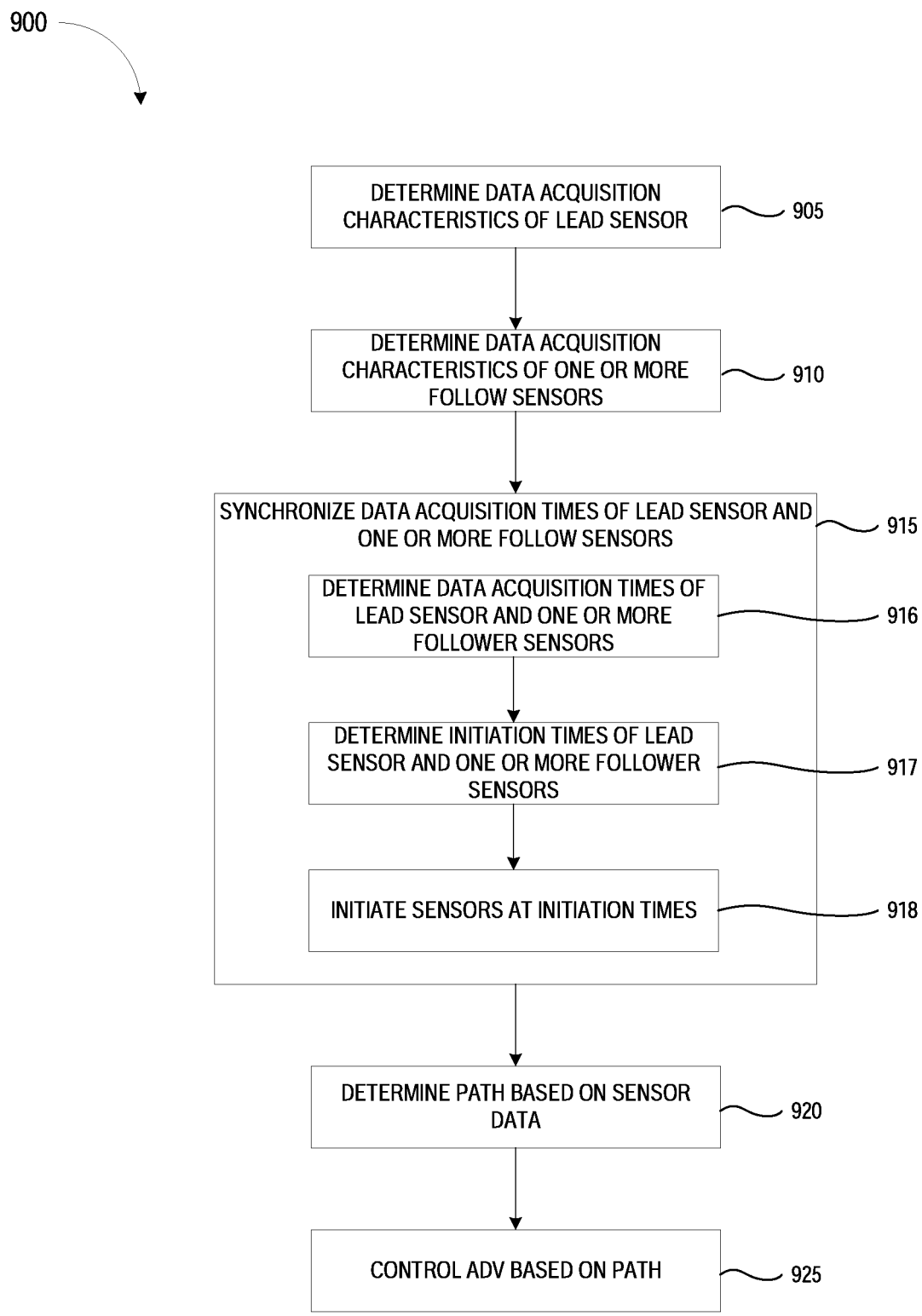
FIG. 9 is a flowchart illustrating an example process for synchronizing sensors of an autonomous driving vehicle according to one embodiment.

FIG. 9 is a flowchart illustrating an example process 900 for synchronizing sensors of an autonomous driving vehicle according to one embodiment. Process 900 may be performed by processing logic which may include software, hardware, or a combination thereof. Process 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 900 may be performed by a processing device, a synchronization module (e.g., synchronization module 519 illustrated in FIGS. 5 and 7), portions of a synchronization module (e.g., lead sensor modules, initiation modules and/or follower sensors modules illustrated in FIG. 7), etc.

At block 905, the process 900 may determine one or more data acquisition characteristics of a lead sensor. For example, the process 900 may query the lead sensor or may access a configuration file. At block 910, the process 900 may determine one or more data acquisition characteristics of one or more follower sensors. For example, the process 900 may query the one or more follower sensors or may access one or more configuration files.

At block 915, the process 900 may synchronize the data acquisition time of the lead sensor, and the data acquisition times one or more follower sensors. For example, the process 900 may determine the data acquisition times of the lead sensor and the one or more follower sensors (e.g., when the sensors should simultaneously obtain, gather, record, collect, etc., sensor data). The data acquisition times of the lead sensor and the one or more follower sensors may be determined based on the data acquisition characteristics of the lead sensor and the one or more follower sensors (e.g., based on initialization delays, acquisition delays, etc.). At block 917, the process 900 may determine initiation times of the lead sensor and/or the one or more follower sensors. For example, if the lead sensor is able to support the user of initiation times, the process 900 may determine initiation times of the lead sensor and the one or more follower sensors. In another example, if the lead sensor is unable to support the user of initiation times, the process 900 may determine initiation times of the one or more follower sensors. At block 917, the process 900 may initiate the sensors (e.g., the lead sensor and/or the one or more follower sensors) at the initiation times. Thus may cause the lead sensor and/or the one or more follower sensors to collect, record, obtain, gather, etc., sensor data.

At block 920, the process 900 may determine a path for the ADV based on the sensor data. For example, may determine a path on a road that avoids obstacles detected by the sensors of the ADV. At block 925, the process 900 may control the ADV based on the path. For example, the process 900 may cause the ADV to drive along the path.

Figure 10A:
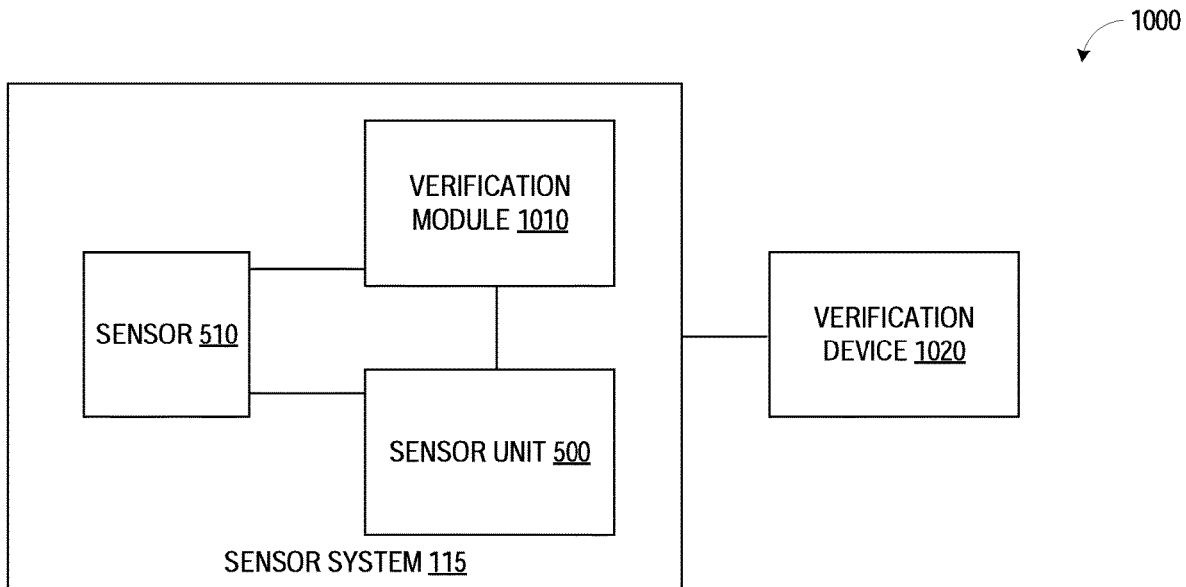
FIG. 10A is a block diagram illustrating an example sensor verification system according to one embodiment.

FIG. 10A is a block diagram illustrating an example sensor verification system 1000 according to one embodiment. The verification system 1000 includes a sensor system 115 and verification device 1020. The sensor system 115 includes a sensor 510, a verification module 101, and a sensor unit 500. The sensor system 115 may also include a host system (not illustrated in FIG. 10A), as discussed above. Sensor 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc. Although one sensor 510 is illustrated in FIG. 10A, the sensor system 115 may include multiple sensors in other embodiments.

In one embodiment sensor 510 may be an active sensor. An active sensor may be a sensor that may emit, transmit, propagate, generate, etc., waves. For example, an active sensor may transmit or emit electromagnetic waves (e.g., radio waves, light waves, infrared waves, etc.) and may detect reflections of the electromagnetic waves to detect an object in an environment around an autonomous vehicle. In another example, an active sensor may emit or transmit sound waves and may detect reflections of the sound waves to detect an object in an environment around an autonomous vehicle. Examples of active sensors may include a radar sensor/device, a LIDAR sensor/device, an ultrasonic sensor/device, etc. In another embodiment, sensor 510 may be a passive sensor. A passive sensor may be a sensor that does not emit, transmit, propagate, generate, etc., waves. For example, a passive sensor may detect electromagnetic waves or sound waves to detect an object in an environment around an autonomous vehicle. Examples of passive sensors may include microphones, cameras, video cameras, etc.

Sensor unit 500 may be implemented in a form of an FPGA device or an ASIC device. The sensor unit 500 may communicate with the sensor 510 via a sensor interface and may communicate with host system via a host interface, as discussed above. The sensor interface can include one or more of Ethernet, USB, LTE or cellular, WiFi, GPS, camera, CAN, serial, SIM card, and/or other GPIO interfaces. Host interface 505 may be any high speed or high bandwidth interface such as PCIe interface. The sensor unit 500 may receive sensor data from sensor 510 via sensor interface and process the sensor data (e.g., format conversion, error checking). The sensor unit 500 may transfer the processed data to the host system using a communication protocol compatible with host interface. Similarly, for the transmitting path or downstream direction, sensor unit 500 may receive data or commands from host system. The data is then processed by sensor unit 500 to a format that is compatible with the sensor 510. The processed data is then transmitted to the sensor 510.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time. Note that sensor 510 can be any kind of sensor and provided by various vendors or suppliers. Sensor unit 500 is configured to handle different types of sensors and their respective data formats and communication protocols.

In one embodiment, sensor unit 500 also includes a time generation circuit (not illustrated in FIG. 10A). The time generation circuit may generate a signal that may indicate the time and/or may be used to determine a time (e.g., a global time, a reference time, etc.) for the components of the verification system 1000. For example, the time generation circuit may be a clock that may continuously output the current time or a timing signal that indicates the current time. The sensor 510 and the verification module may use the timing signal to determine timestamps and/or to determine when to perform operations, actions, etc. In one embodiment, the time generation circuit may be part of the verification module 1010. In another example, the time generation circuit may be part of the sensor unit 500, as discussed above. In a further embodiment, the time generation circuit may separate from the verification module 1010 and the sensor unit 500.

The verification system 1000 includes a verification device 101. In one embodiment, the verification device 1020 may be a detector. A detector may be a device that may detect waves that are generated, emitted, transmitted, etc., by the sensor 510. For example, the sensor 510 may be a LIDAR device (e.g., an active sensor) and the verification device 1020 may be a photodetector that may detect the lights waves (e.g., the laser) emitted by the LIDAR device. In another example, the sensor 510 may be a radar device (e.g., an active sensor) and the verification device 1020 may be an antenna that detects the radio waves emitted by the radar device. In a further example, the sensor 510 may be an ultrasonic device (e.g., an active sensor) and the verification device 1020 may be a microphone that detects sound waves emitted by the ultrasonic device.

The sensor system 115 also includes a verification module 1010. In embodiment the verification module 1010 may verify the operation of the sensor 510. For example, the verification module 1010 may determine whether the sensor 510 is able to initiate the capture of sensor data quickly enough (e.g., whether the initialization delay is with an acceptable time/range). In another example, the verification module 1010 may determine whether the sensor 510 is able to capture sensor data quickly enough (e.g., whether the acquisition delay is within an acceptable time/range). In a further example, the verification module 1010 may determine whether the sensor 510 is able to transmit sensor data to another device (e.g., to a host system) quickly enough. In yet another example, the verification module 1010 may determine whether the sensor 510 was able to detect an object, based on the sensor data generated by the sensor 510.

As discussed above, if sensors do not capture, obtain, record, sensor data simultaneously or at the same time (e.g., if sensors are not synchronized), it may be more difficult for the ADV to correlate and/or use the sensor data from multiple sensors. For example, it may be more difficult for the ADV to determine whether an object detected by one sensor is the same as an object detected by a second sensor, or it may be more difficult for the ADV to determine the position of the object if the two sensors are detecting the object at different points in time. Synchronizing the sensors of the ADV may allow the ADV to correlate or more easily correlate different sensor data from different sensors. Correlating sensor data from different sensors may allow the ADV to detect vehicles, objects, obstacles, pedestrians, lanes, etc., in an environment more quickly, efficiently, easily and/or with more accuracy. For example, the ADV may be able to correlate the sensor data more easily and may be more confident that there is an object in the environment. In another example, the ADV may be able to more easily determine the location, speed, and/or heading of an object in the environment if the ADV is able to correlate the sensor data from multiple sensors more easily.

Verifying the operation of the sensor 510 may allow the sensor system 115 (e.g., a synchronization module 519 illustrated in FIGS. 5 and 7) to correctly synchronize the sensor 510 with other sensors in the autonomous driving vehicle. For example, if the sensor is not operating properly (e.g., is taking too long to acquire sensor data, is taking too long to initialize, etc.), the sensor system 115 may not be able to properly synchronize the sensor 510 with other sensors. The verification module 1010 may allow the sensor system 115 to verify that the sensor 510 is operating properly which may allow the sensor to be properly synchronized with the other sensors in the autonomous driving vehicle. If the sensor 510 is not operating properly, the verification module 1010 may be able to provide an indicating that the sensor 510 is not operating properly (e.g., send an error messages, display an error message, etc.). This may allow the user (e.g., a driver/passenger, a mechanic, a technician, etc.) to know when the sensor 510 is not operating properly and replace the sensor 510.

Figure 10B:
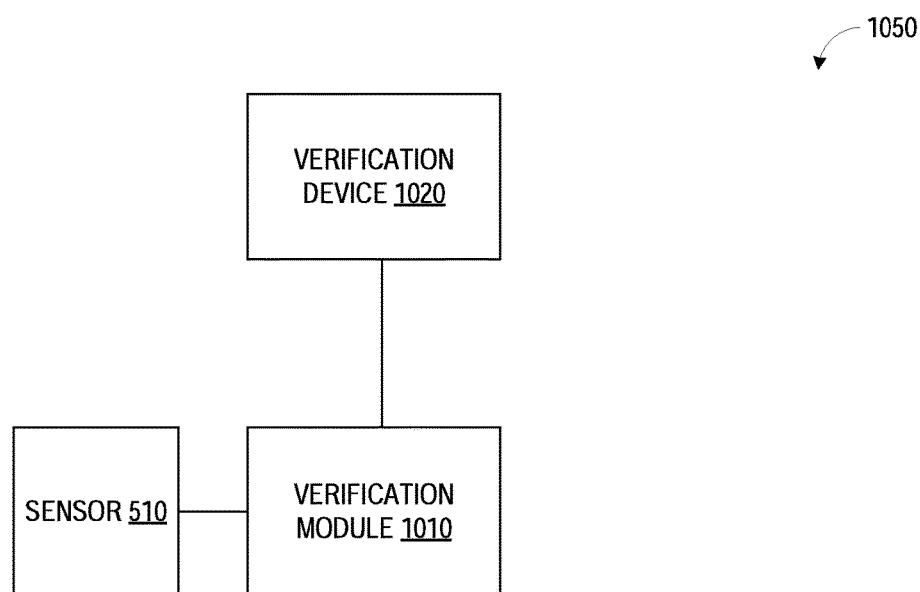
FIG. 10B is a block diagram illustrating an example sensor verification system according to one embodiment.

FIG. 10B is a block diagram illustrating an example sensor verification system 1050 according to one embodiment. The verification system 1050 includes a sensor 510, a verification module 1010, and a verification device 1020. Sensor 510 can include a variety of sensors that are utilized in an autonomous driving vehicle (e.g., a LIDAR device, a radar device, an ultrasonic sensor, a camera, a video camera, a GPS receiver, etc. Although one sensor 510 is illustrated in FIG. 10B, verification system 1050 may include multiple sensors in other embodiments.

In one embodiment sensor 510 may be an active sensor (e.g., a LIDAR sensor/device, a radar sensor/device, an IR sensor/device, an ultrasonic sensor/device). An active sensor may be a sensor that may emit, transmit, propagate, generate, etc., waves (e.g., radio waves, light waves, infrared waves, sound waves, etc.) and may detect reflections of the waves to detect an object in an environment around an autonomous vehicle. In another embodiment, sensor 510 may be a passive sensor. A passive sensor may be a sensor (e.g., a camera, a video camera, a GPS receiver, a microphone, etc.) that does not emit, transmit, propagate, generate, etc., waves. The sensor 510 may be coupled to the verification module 1010 via a sensor interface. As discussed above, the sensor interface can include one or more of Ethernet, USB, LTE or cellular, WiFi, GPS, camera, CAN, serial, SIM card, a PCIe interface, and/or other GPIO interfaces. The verification module 1010 may receive sensor data from sensor 510 via sensor interface and process the sensor data (e.g., format conversion, error checking). In one embodiment verification module 1010 is configured to control certain operations of sensors 510, such as, for example, timing of activation of capturing sensor data. This may allow the verification module 1010 to verify the operation of the sensor 510.

In one embodiment, sensor unit 500 also includes a time generation circuit (not illustrated in FIG. 10A). The time generation circuit may generate a signal that may indicate the time and/or may be used to determine a time (e.g., a global time, a reference time, etc.) for the components of the verification system 1000. For example, the time generation circuit may be a clock that may continuously output the current time or a timing signal that indicates the current time. The sensor 510, the verification device, and the verification module 1030 may use the timing signal to determine timestamps and/or to determine when to perform operations, actions, etc. In one embodiment, the time generation circuit may be part of the verification module 1010. In another example, the time generation circuit may be part of the sensor unit 500, as discussed above. In a further embodiment, the time generation circuit may separate from the verification module 1010 and the sensor unit 500.

The verification system 1000 includes a verification device 101. In one embodiment, the verification device 1020 may be a detector. A detector may be a device that may detect waves that are generated, emitted, transmitted, etc., by the sensor 510. For example, the sensor 510 may be a LIDAR device (e.g., an active sensor) and the verification device 1020 may be a photodetector that may detect the lights waves (e.g., the laser) emitted by the LIDAR device. In another example, the sensor 510 may be a radar device (e.g., an active sensor) and the verification device 1020 may be an antenna that detects the radio waves emitted by the radar device. In a further example, the sensor 510 may be an ultrasonic device (e.g., an active sensor) and the verification device 1020 may be a microphone that detects sound waves emitted by the ultrasonic device.

The sensor system 115 also includes a verification module 1010. In embodiment the verification module 1010 may verify the operation of the sensor 510. For example, the verification module 1010 may determine whether the sensor 510 is able to initiate the capture of sensor data quickly enough (e.g., whether the initialization delay is with an acceptable time/range). In another example, the verification module 1010 may determine whether the sensor 510 is able to capture sensor data quickly enough (e.g., whether the acquisition delay is within an acceptable time/range). In a further example, the verification module 1010 may determine whether the sensor 510 is able to transmit sensor data to another device (e.g., to a host system) quickly enough. In yet another example, the verification module 1010 may determine whether the sensor 510 was able to detect an object, based on the sensor data generated by the sensor 510.

As discussed above, if sensors do not capture, obtain, record, sensor data simultaneously or at the same time, it may be more difficult for the ADV to correlate and/or use the sensor data from multiple sensors. Synchronizing the sensors of the ADV may allow the ADV to correlate or more easily correlate different sensor data from different sensors. Correlating sensor data from different sensors may allow the ADV to detect vehicles, objects, obstacles, pedestrians, lanes, etc., in an environment more quickly, efficiently, easily and/or with more accuracy. Verifying the operation of the sensor 510 may allow a user (e.g., a technician, a mechanic, etc.) to determine whether the sensor 510 can be properly synchronized with other sensors in an autonomous driving vehicle. The verification module 1010 may allow the sensor system 115 to verify that the sensor 510 is operating properly which may allow the sensor 510 to be properly synchronized with the other sensors in the autonomous driving vehicle. If the sensor 510 is not operating properly, the verification module 1010 may be able to provide an indicating that the sensor 510 is not operating properly (e.g., send an error messages, display an error message, etc.). This may allow the user to know when the sensor 510 is not operating properly and replace the sensor 510.

Figure 11:
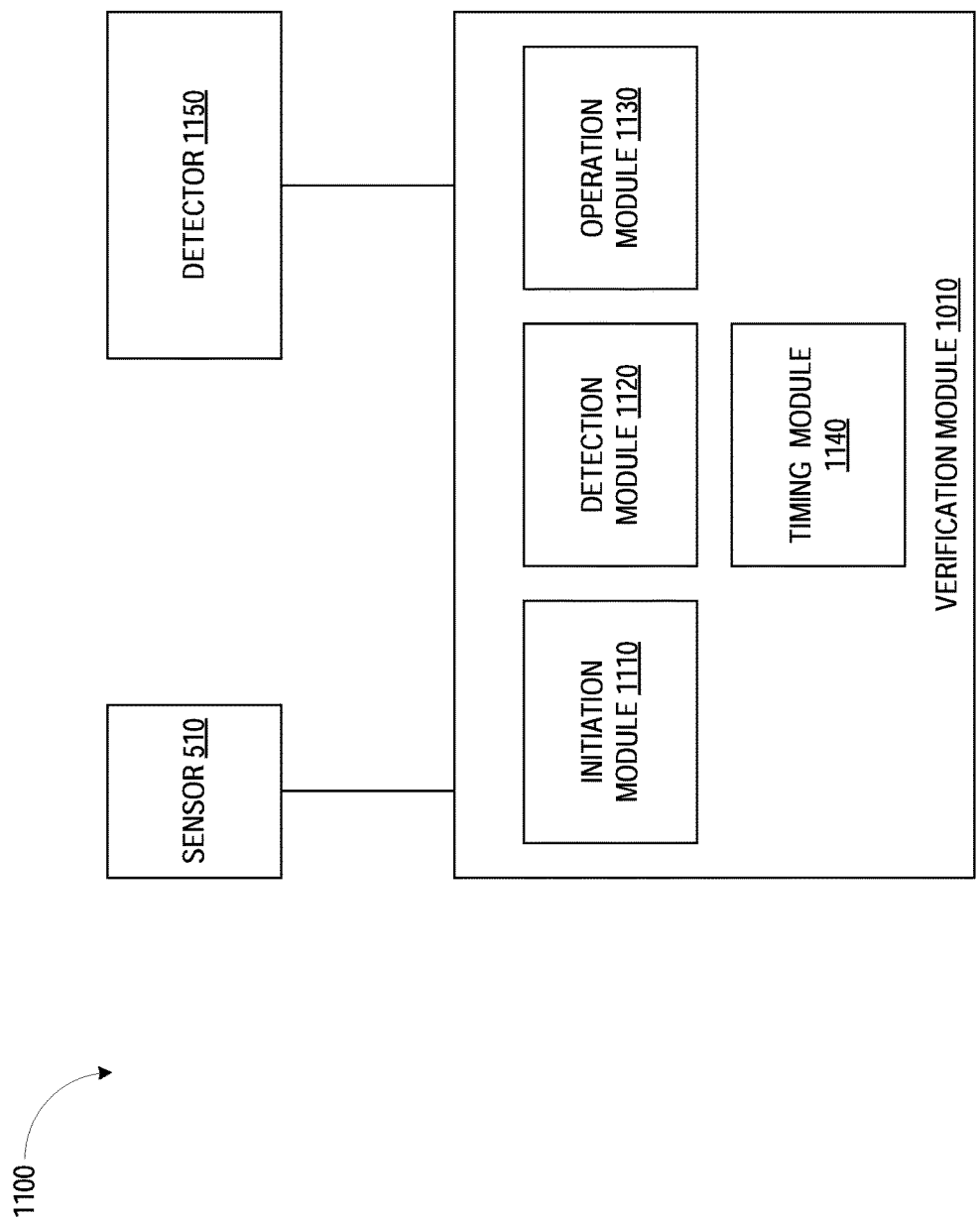
FIG. 11 is a block diagram illustrating an example verification system according to one embodiment.

FIG. 11 is a block diagram illustrating an example verification system 1100 according to one embodiment. The verification system 1100 includes a sensor 510, a verification module 1010, and a detector 1150. The sensor 510 may be an active sensor, such as a LIDAR device, a radar device, an ultrasonic device, an infrared device/senor (e.g., a device that emits infrared waves), an ultraviolet device/senor (e.g., a device that emits ultraviolet waves), etc. As discussed above, an active sensor may be a device that emits, transmits, generates, etc., waves (e.g., radio waves, light waves, electromagnetic waves, sound waves, etc.). The verification module 1010 includes an initiation module 1110, a detection module 1120, an operation module 1130, and a timing module 1140.

In one embodiment, the initiation module 1110 (e.g., the verification module) may cause a sensor to obtain sensor 510 to obtain sensor data and/or to start obtaining sensor data (e.g., to initiate the operations, processes, functions, actions, etc., to obtain sensor data). For example, the initiation module 1110 may initiate the capture, acquisition, recording, etc., of sensor data. In one embodiment, the initiation module 1110 may transmit a frame, message, packet, instruction, etc., to the sensor 510 to cause the sensor 510 to begin capturing sensor data. The message, packet, instruction, etc., may initiate, trigger, cause, etc., the sensor 510 to capture sensor data. In another embodiment, the initiation module 1110 may transmit a signal (e.g., one or more voltages on an electrical line) to the sensor 510 to cause the sensor 510 to begin capturing sensor data. The initiation module 1110 may determine the time that the initiation module 1110 caused the sensor to begin capturing sensor data based on a timing signal generated by the timing module 1140, as discussed in more detail below. The initiation module 1110 may generate a timestamp or some other information to indicate the time when the initiation module 1110 caused the sensor to begin capturing sensor data.

In one embodiment, the detection module 1120 (e.g., the verification module 1010) may determine whether the detector 1150 has detected the waves emitted, generated, transmitted, etc., by the sensor 510. As discussed above, the detector 1150 may some type of detector and/or detection device that may detect the waves emitted, generated, transmitted, etc., by the sensor 510 (e.g., electromagnetic waves, sound waves, etc.). The detector 1150 may be a photodetector, an antenna, a microphone, etc. The detection module 1120 (e.g., the verification module 1010) may be coupled to the detector 1150. The detection module 1120 may also determine the time when the detector 1150 detected the waves emitted by the sensor 510. For example, the detection module 1120 may receive a signal (e.g., one or more voltages on an electrical line) and/or a message from the detector 1150 indicating that the detector 1150 has detected waves emitted by the sensor 510. The detection module 1120 may determine when the signal and/or message was received from the detector 1150 based on a timing signal generated by the timing module 1140 (which is discussed in more detail below). The detection module 1120 may generate a timestamp or some other information to indicate the time that the signal and/or message were received from the detector 1150.

In one embodiment, the operation module 1130 may receive sensor data from the sensor 510. The sensor data may be data obtained and/or generated by the sensor. The sensor data may indicate information about the environment in which autonomous vehicle operates. For example, the sensor data may indicate and/or identify one or more objects that are in the environment where the autonomous vehicle is located. The operation module 1130 may determine when the sensor data was received from sensor 510. For example, the operation module 1130 may determine when the sensor data was received from the sensor 510 based on a timing signal generated by the timing module 1140 (which is discussed in more detail below). The operation module 1130 may generate a timestamp or some other information to indicate the time that the sensor data was received from the sensor 510.

The operation module 1130 may verify the operation of the sensor 510 based on one or more of the times and/or timestamps determined by the initiation module 1110, the detection module 1120, and the operation module 1130. In one embodiment, the operation module 1130 may determine the initialization delay of the sensor 510 based on the time the initiation module 1110 caused the sensor 510 to obtain sensor data (e.g., a first time and/or timestamp), and the time when the detector 1150 detected waves emitted by the sensor 510 (e.g., a second time and/or timestamp). For example, the operation module 1130 may determine the initialization delay based on the difference between the first time and the second time. If the initialization delay is less than or equal to a threshold time (e.g., less than a threshold period of time), the operation module 1130 may determine that the sensor 510 is operating properly and/or within acceptable levels of performance. If the initialization delay is greater than a threshold time, the operation module 1130 may determine that the sensor 510 is not operating properly and/or not within acceptable levels of performance. In a further example, the operation module 1130 may determine whether the initialization delay of the sensor 510 is within a threshold of a reference initialization delay for the sensor. The reference initialization delay may be based on data acquisition characteristics of the sensor 510. If the initialization delay is within a threshold of the reference initialization delay, then the sensor 510 may be operating properly, and vice versa.

In one embodiment, the operation module 1130 may verify the operation of the sensory by determining whether the acquisition delay of the sensor 510 based on the time the initiation module 1110 caused the sensor 510 to obtain sensor data (e.g., a first time and/or timestamp), the time when the detector 1150 detected waves emitted by the sensor 510 (e.g., a second time and/or timestamp), and the time when the operation module 1130 received the sensor data from the sensor 510 (e.g., a third time and/or timestamp). For example, the operation module 1130 may determine the acquisition delay based on a difference the second time and the third time. If the acquisition delay is less than or equal to a threshold time (e.g., less than a threshold period of time), the operation module 1130 may determine that the sensor 510 is operating properly and/or within acceptable levels of performance. If the acquisition delay is greater than a threshold time, the operation module 1130 may determine that the sensor 510 is not operating properly and/or not within acceptable levels of performance. In a further example, the operation module 1130 may determine whether the acquisition delay of the sensor 510 is within a threshold of a reference acquisition delay for the sensor. The reference acquisition delay may be based on data acquisition characteristics of the sensor 510. If the acquisition delay is within a threshold of the reference acquisition delay, then the sensor 510 may be operating properly, and vice versa.

In one embodiment, the operation module 1130 may verify the operation of the sensor 510 based on the differences between the first time and the third time. The difference between the first time and the third time may indicate the total amount of time it takes for the sensor 510 to obtain sensor data. The operation module 1130 may determine whether the total amount of time is less than or equal to a threshold (e.g., if the total amount of time for the sensor 510 to obtain sensor data is less 10 milliseconds, 200 milliseconds, or some other appropriate period of time). If the total amount of time is less than or equal to a threshold, the operation module 1130 may determine that the sensor 510 is operating properly. If the total amount of time is more than the threshold, the operation module 1130 may determine that the sensor is not operating properly.

In one embodiment, the sensor data received by the operation module 1130 may include a timestamp. The timestamp may indicate the time that the sensor 510 generated the sensor data. The operation module 1130 may determine whether the time stamp is accurate the time when the detector 1150 detected waves emitted by the sensor 510 (e.g., a second time and/or timestamp) and the time when the operation module 1130 received the sensor data from the sensor 510 (e.g., a third time and/or timestamp). For example, the operation module 1130 may determine whether the timestamp indicates a time that is less than or earlier than the third time, and is later than the first time. If the time stamp indicates a time that is less than or earlier than the third time, and is later than the first time, the operation module 1130 may determine that the sensor is operating properly, and vice versa.

In one embodiment, the operation module 1130 may determine whether the sensor data received from the sensor 510 indicates that an object was detected by the sensor. For example, a reference object may be present in the environment. The operation module 1130 may determine whether the sensor data indicates that the sensor 510 detected the presence of the reference object in the environment. If the sensor 510 detects the presence, location, speed, and/or heading of the reference object, the operation module 1130 may determine that the sensor 510 is operating properly, and vice versa.

In one embodiment, the timing module 1140 may generate a timing signal. The timing signal may be used by the sensor 510 and the detector 1150 to determine a reference time. For example, the timing signal may indicate the current time and/or may be used by the sensor 510 and/or detector 1150 to determine the current time. This may allow all of the components of the verification system 1100 (e.g., the sensor 510, the detector 1150, and the verification module 1010) to operate using the same reference time.

As discussed above, synchronizing the sensors of the ADV may allow the ADV to correlate or more easily correlate different sensor data from different sensors. Correlating sensor data from different sensors may allow the ADV to detect vehicles, objects, obstacles, pedestrians, lanes, etc., in an environment more quickly, efficiently, easily and/or with more accuracy. Verifying the operation of the sensor 510 may allow a user (e.g., a technician, a mechanic, etc.) to determine whether the sensor 510 can be properly synchronized with other sensors in an autonomous driving vehicle. The verification module 1010 may allow the sensor system 115 to verify that the sensor 510 is operating properly which may allow the sensor 510 to be properly synchronized with the other sensors in the autonomous driving vehicle. If the sensor 510 is not operating properly, the verification module 1010 may be able to provide an indicating that the sensor 510 is not operating properly (e.g., send an error messages, display an error message, etc.). This may allow the user to know when the sensor 510 is not operating properly (e.g., whether the sensor is defective) and replace the sensor 510.

Figure 12:
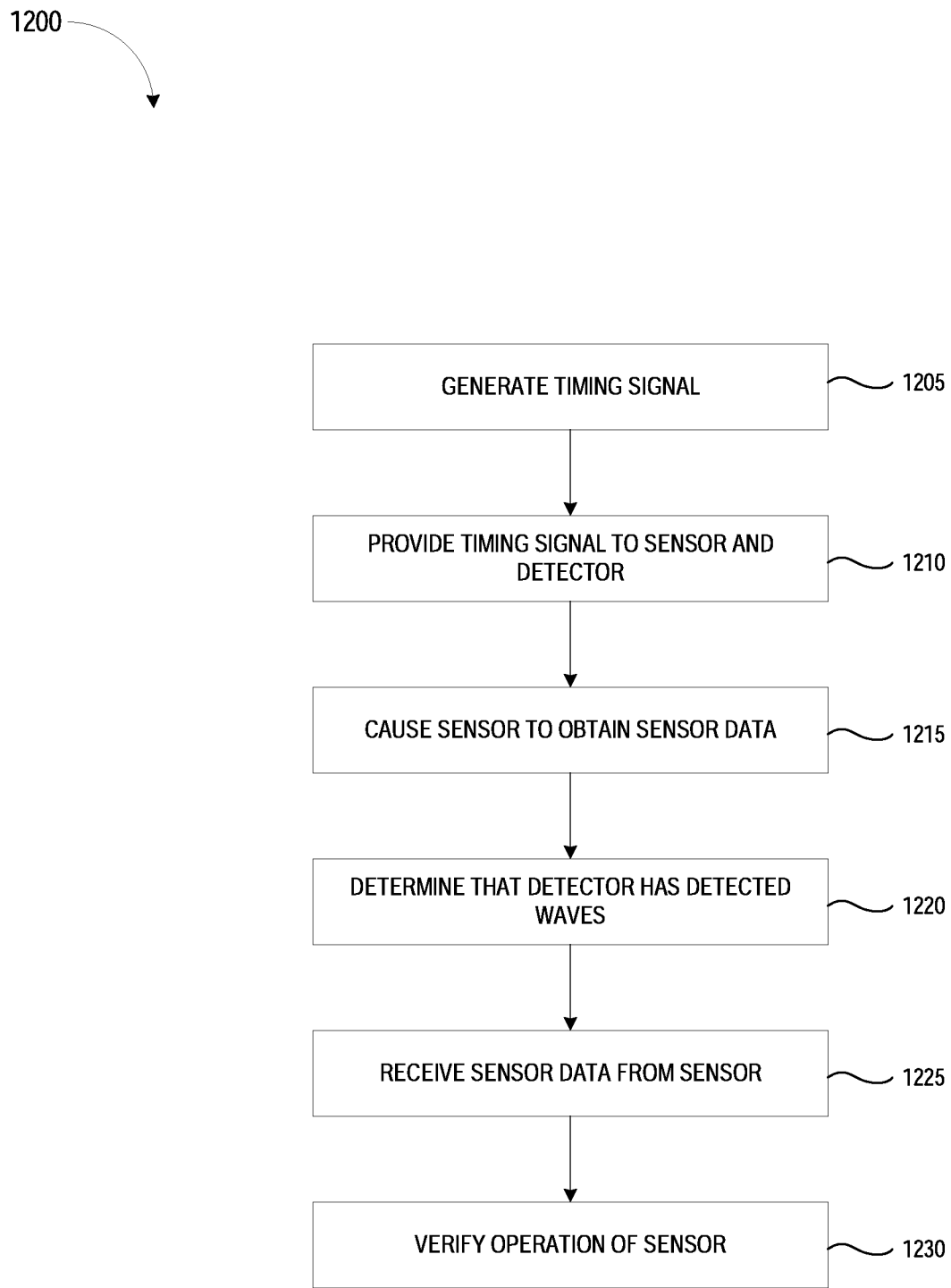
FIG. 12 is a flowchart illustrating an example process for verifying sensors used in an autonomous driving vehicle according to one embodiment.

FIG. 12 is a flowchart illustrating an example process for verifying sensors used in an autonomous driving vehicle according to one embodiment. Process 1200 may be performed by processing logic which may include software, hardware, or a combination thereof. Process 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 1200 may be performed by a processing device, a verification module (e.g., verification module 1010 illustrated in FIGS. 10A, 10B, 11, and 13), portions of a verification module (e.g., an initiation module, a detection module, an operation module, and/or a timing module illustrated in FIG. 11), etc.

At block 1205, the process 1200 may generate a timing signal. For example, the process 1200 may generate a continuous signal that indicates the current time. At block 1205, the process 1200 may provide the timing signal to a sensor and/or a detector. This may allow the sensor and/or detect to operate using the same current time. At block 1215, the process 1200 may cause the sensor to obtain sensor data at a first time. For example, the process 1200 may transmit a message and/or signal to the sensor to cause the sensor to obtain sensor data. At block 1220, the process 1200 may determine that a detector has detected waves generated by the sensor at a second time. For example, the process 1200 may receive a signal or a message from the detected indicating that the detected has detected an electromagnetic wave or sound wave generated by the sensor. At block 1225, the process 1200 may receive sensor data from the sensor at a third time.

At block 1230, the process 1200 may verify the operation of the sensor based on one or more of the first time, the second time, and/or the third time. For example, the process 1200 may determine whether the initialization time of the sensor is within a threshold of a reference initialization time, as discussed above. In another example, the process 1200 may determine whether an acquisition time of the sensor is within a threshold of a reference acquisition time, as discussed above.

Figure 13:
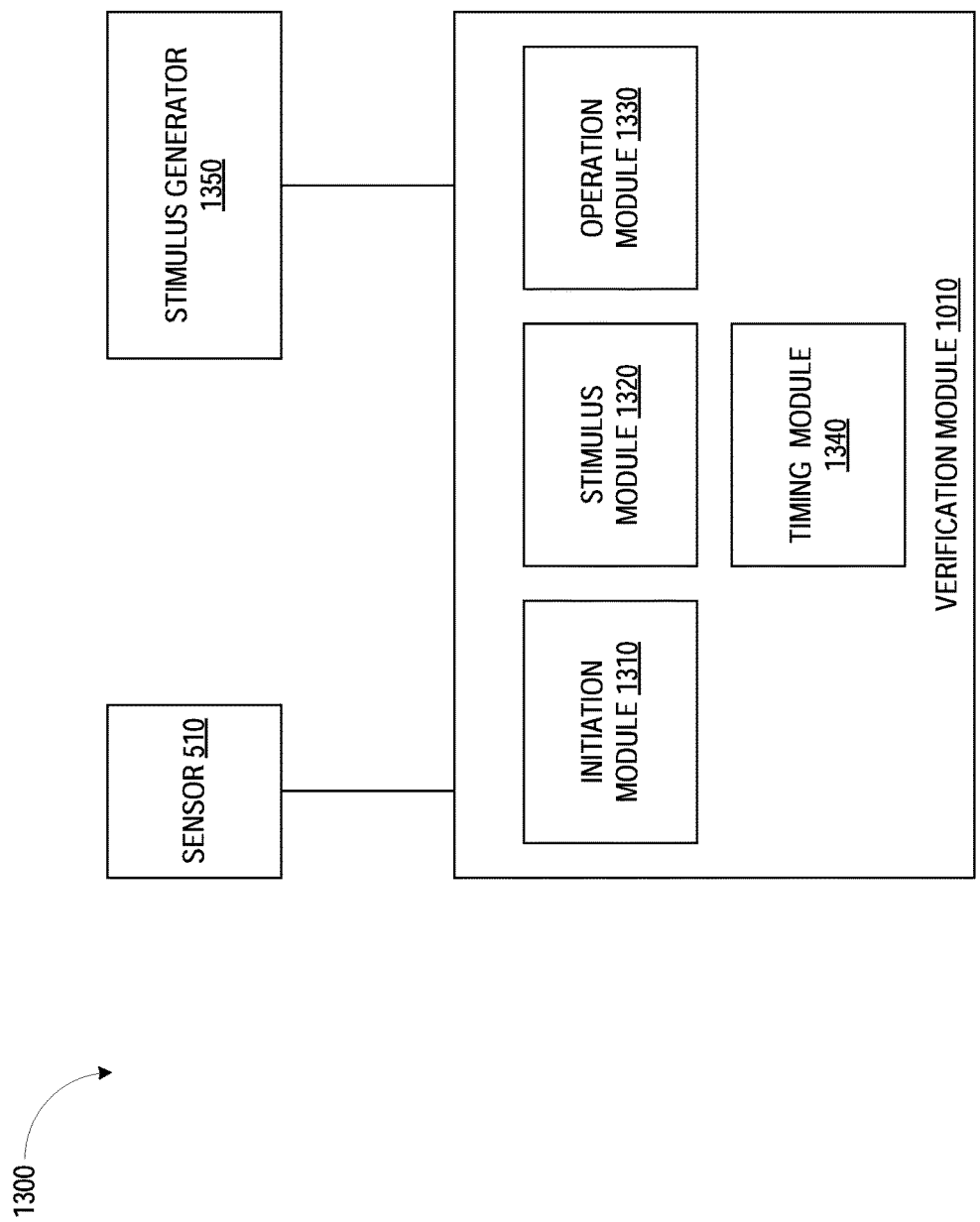
FIG. 13 is a block diagram illustrating an example verification system according to one embodiment.

FIG. 13 is a block diagram illustrating an example verification system 1300 according to one embodiment. The verification system 1300 includes a sensor 510, a verification module 1010, and a stimulus generator 1350. The sensor 510 may be a passive sensor, such as a camera, a video camera, a microphone, a GPS receiver, etc. As discussed above, a passive sensor may be a device that does not emit, transmit, generate, etc., waves (e.g., radio waves, light waves, electromagnetic waves, sound waves, etc.). The verification module 1010 includes an initiation module 1310, a stimulus module 1320, an operation module 1330, and a timing module 1340.

In one embodiment, the initiation module 1310 (e.g., the verification module) may cause a sensor sensor 510 to obtain sensor data and/or to start obtaining sensor data (e.g., to initiate the operations, processes, functions, actions, etc., to obtain sensor data), as discussed above. The initiation module 1310 may transmit a frame, message, packet, instruction, etc., to the sensor 510 to cause the sensor 510 to begin capturing sensor data. The initiation module 1310 may also transmit a signal (e.g., one or more voltages on an electrical line) to the sensor 510 to cause the sensor 510 to begin capturing sensor data. The initiation module 1310 may determine the time that the initiation module 1310 caused the sensor to begin capturing sensor data based on a timing signal generated by the timing module 1340. The initiation module 1310 may generate a timestamp or some other information to indicate the time when the initiation module 1310 caused the sensor to begin capturing sensor data.

In one embodiment, the stimulus module 1320 may generate a stimulus which may be detected by the sensor 510. The stimulus module 1320 may generate the stimulus for a period of time. For example, the stimulus module 1320 may generate a light, a sound, etc., for a period of time. The period of time may be based on the data acquisition characteristics for the sensor 510. For example, the period of time may be based on the initialization delay and the acquisition delay for the sensor 520. Based on the initialization delay, the stimulus module may start the period of time at or after the time when the sensor 510 has been initialized. Based on the acquisition delay, the stimulus module 1320 may end the period of time such that the period of time is the same as or within a threshold of the acquisition delay. By generating the stimulus during the acquisition delay of the sensor 510, the stimulus module 1320 may allow the operation module 1330 to determine whether the sensor 510 detected the stimulus during the acquisition delay. The stimulus module 1320 may also allow the operation module 1330 to determine whether the initialization delay of the sensor 510 is acceptable. The stimulus module 1320 may further allow the operation module 1330 to determine whether the acquisition delay of the sensor 510 is acceptable. The stimulus module 1320 may transmit a message and/or signal to the stimulus generator 1350 to cause the stimulus generator 1350 to generate the stimulus. For example, the message may indicate when and how long the stimulus generator 1350 should generate the stimulus.

In one embodiment, the stimulus module 1320 may determine the time period that the stimulus generator 1350 should generate the stimulus, based on a reference initialization delay and a reference acquisition delay for the sensor 510. For example, based on the reference initialization delay and the time when the initiation module 1310 cause the sensor 510 to obtain sensor data, the stimulus module 1320 may determine when to start generating the stimulus. In another example, based on the reference acquisition delay for the sensor 510, the stimulus module 1320 may determine how long the stimulus should be generated (e.g., when to stop generating the stimulus).

In one embodiment, the operation module 1330 may receive sensor data from the sensor 510. The sensor data may be data obtained and/or generated by the sensor. The sensor data may indicate information about the environment in which autonomous vehicle operates. The operation module 1330 may determine when the sensor data was received from sensor 510. The operation module 1330 may generate a timestamp or some other information to indicate the time that the sensor data was received from the sensor 510.

The operation module 1330 may verify the operation of the sensor 510 based on one or more of the times and/or timestamps determined by the initiation module 1310, the stimulus module 1320, and the operation module 1330. In one embodiment, the operation module 1330 may determine the initialization delay of the sensor 510 based on the time the initiation module 1310 caused the sensor 510 to obtain sensor data (e.g., a first time and/or timestamp), the time when the stimulus generator 1350 generated a stimulus for the sensor 510 to detect (e.g., a second time and/or timestamp), and whether the stimulus was detected by the sensor 510. For example, if the initialization delay is between time T0 and T1 and the stimulus generator 1350 generates the stimulus at time T1 through T2, the operation module 1130 may determine whether the stimulus was detected during the time T1 through T2, or within a threshold of time T1 through T2 (e.g., within a threshold time before time T1 or after T2). If the initialization delay is greater than a threshold time, the operation module 1330 may determine that the sensor 510 is not operating properly and/or not within acceptable levels of performance. In a further example, the operation module 1330 may determine whether the initialization delay of the sensor 510 is within a threshold of a reference initialization delay for the sensor. The reference initialization delay may be based on data acquisition characteristics of the sensor 510. If the initialization delay is within a threshold of the reference initialization delay, then the sensor 510 may be operating properly, and vice versa.

In one embodiment, the operation module 1330 may verify the operation of the sensory by determining whether the acquisition delay of the sensor 510 based on the time the stimulus generator 1350 cause the stimulus generator 1350 to generate the stimulus and the time when the operation module 1330 received the sensor data from the sensor 510 (e.g., a third time and/or timestamp). For example, the operation module 1330 may determine the acquisition delay based on a difference the second time and the third time, and whether the stimulus was detected during the acquisition delay. If the acquisition delay is less than or equal to a threshold time (e.g., less than a threshold period of time), the operation module 1330 may determine that the sensor 510 is operating properly and/or within acceptable levels of performance. If the acquisition delay is greater than a threshold time, the operation module 1330 may determine that the sensor 510 is not operating properly and/or not within acceptable levels of performance. In a further example, the operation module 1330 may determine whether the acquisition delay of the sensor 510 is within a threshold of a reference acquisition delay for the sensor. The reference acquisition delay may be based on data acquisition characteristics of the sensor 510. If the acquisition delay is within a threshold of the reference acquisition delay, then the sensor 510 may be operating properly, and vice versa.

In one embodiment, the stimulus module 1320 may determine whether the how long the stimulus was detected by the sensor 510 during the acquisition delay. If the stimulus was detected during a threshold amount of the acquisition delay (e.g., during 90% of the acquisition delay, during 85% of the acquisition delay, or some other appropriate amount), then the sensor 510 may be operating properly, and vice versa.

In one embodiment, the operation module 1330 may verify the operation of the sensor 510 based on the differences between the first time and the third time. The difference between the first time and the third time may indicate the total amount of time it takes for the sensor 510 to obtain sensor data. The operation module 1330 may determine whether the total amount of time is less than or equal to a threshold. If the total amount of time is less than or equal to a threshold, the operation module 1330 may determine that the sensor 510 is operating properly. If the total amount of time is more than the threshold, the operation module 1330 may determine that the sensor is not operating properly.

In one embodiment, the operation module 1330 may determine whether the sensor data received from the sensor 510 indicates that the stimulus generated by the stimulus generated (e.g., a light, a sound, etc.) was detected by the sensor 510. For example, the stimulus module 1320 may cause a light to turn on for a period of time. The operation module 1330 may determine whether the sensor data from sensor 510, which may be a camera, indicates that the sensor 510 detected the light. If the sensor data indicates that the sensor 510 detected the stimulus, the operation module 1330 may determine that the sensor 510 is operating properly, and vice versa.

In one embodiment, the timing module 1340 may generate a timing signal. The timing signal may be used by the sensor 510 and the stimulus generator 1350 to determine a reference time. The timing signal may indicate the current time and/or may be used by the sensor 510 and/or stimulus generator 1350 to determine the current time. This may allow all of the components of the verification system 1300 (e.g., the sensor 510, the stimulus generator 1350, and the verification module 1010) to operate using the same reference time.

As discussed above, synchronizing the sensors of the ADV may allow the ADV to correlate or more easily correlate different sensor data from different sensors. This may allow the ADV to detect vehicles, objects, obstacles, pedestrians, lanes, etc., in an environment more quickly, efficiently, easily and/or with more accuracy. Verifying the operation of the sensor 510 may allow a user to determine whether the sensor 510 can be properly synchronized with other sensors in an autonomous driving vehicle. The verification module 1010 may allow the sensor system 135 to verify that the sensor 510 is operating properly which may allow the sensor 510 to be properly synchronized with the other sensors in the autonomous driving vehicle. If the sensor 510 is not operating properly, the verification module 1010 may be able to provide an indicating that the sensor 510 is not operating properly. This may allow the user to know when the sensor 510 is not operating properly and replace the sensor 510.

Figure 14:
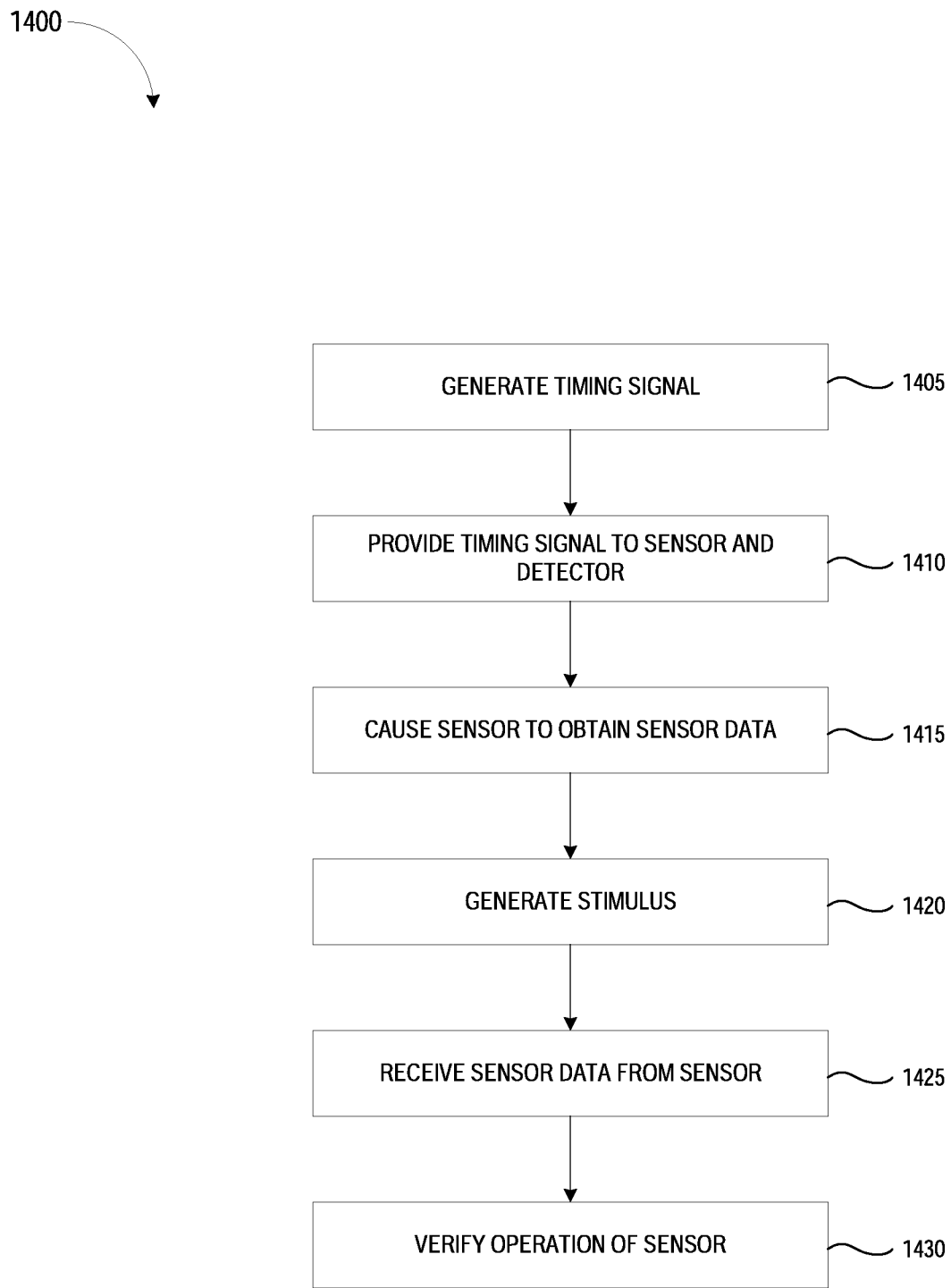
FIG. 14 is a flowchart illustrating an example process for verifying sensors used in an autonomous driving vehicle according to one embodiment.

FIG. 14 is a flowchart illustrating an example process for verifying sensors used in an autonomous driving vehicle according to one embodiment. Process 1400 may be performed by processing logic which may include software, hardware, or a combination thereof. Process 1400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 1400 may be performed by a processing device, a verification module (e.g., verification module 1010 illustrated in FIGS. 10A, 10B, 11, and 13), portions of a verification module (e.g., an initiation module, a stimulus module, an operation module, and/or a timing module illustrated in FIG. 13), etc.

At block 1405, the process 1400 may generate a timing signal. For example, the process 1400 may generate a continuous signal that indicates the current time. At block 1405, the process 1400 may provide the timing signal to a sensor and/or a detector. This may allow the sensor and/or detect to operate using the same current time. At block 1415, the process 1400 may cause the sensor to obtain sensor data at a first time. For example, the process 1400 may transmit a message and/or signal to the sensor to cause the sensor to obtain sensor data. At block 1420, the process 1400 may generate a stimulus for the sensor to detect. For example, the process 1400 cause a stimulus generator to generate sound or light that may be detected by the sensor. At block 1425, the process 1400 may receive sensor data from the sensor at a third time.

At block 1430, the process 1400 may verify the operation of the sensor based on one or more of the first time, the second time, and/or the third time. For example, the process 1400 may determine whether the initialization time of the sensor is within a threshold of a reference initialization time, as discussed above. In another example, the process 1400 may determine whether an acquisition time of the sensor is within a threshold of a reference acquisition time, as discussed above.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A method, comprising:
   causing a sensor to obtain sensor data at a first time, wherein the sensor obtains the sensor data by emitting waves towards a detector;
   determining that the detector has detected the waves at a second time, wherein the second time is based on the first time and an initiation delay of the sensor;
   receiving the sensor data from the sensor at a third time, wherein the third time is based on the second time and an acquisition delay of the sensor;
   verifying an operation of the sensor based on at least one of the first time, the second time, or the third time; and
   further verifying the operation of the sensor based on that the initiation delay or the acquisition delay is within a corresponding threshold, wherein the sensor is utilized to sense a driving environment during autonomous driving of an autonomous driving vehicle.

2. The method of claim 1, wherein causing the sensor to obtain the sensor data at the first time comprises at least one of:
   transmitting a signal to the sensor; or
   transmitting a message to the sensor, wherein the message indicates that the sensor is to obtain the sensor data.

3. The method of claim 1, wherein determining that the detector has detected the waves at the second time comprises at least one of:
   receiving a signal from the detector; or
   receiving a message from the detector.

4. The method of claim 1, wherein verifying the operation of the sensor comprises:
   determining whether a data acquisition delay of the sensor is less than or equal to a threshold acquisition delay based on the second time and the third time.

5. The method of claim 1, wherein verifying the operation of the sensor comprises:
   determining whether an initialization delay is less than or equal to a threshold initialization delay based on the first time and the second time.

6. The method of claim 1, wherein verifying the operation of the sensor comprises:
   determining whether a difference between the first time and the third time is less than a threshold time.

7. The method of claim 1, further comprising:
   generating a timing signal; and
   providing the timing signal to at least one of the sensor or the detector.

8. The method of claim 7, wherein the sensor data comprises a timestamp determined by the sensor based on the timing signal.

9. The method of claim 1, further comprising:
   determining whether the sensor data indicates that an object was detected by the sensor.

10. The method of claim 1, wherein the sensor comprises an active sensor.

11. The method of claim 10, wherein the active sensor comprises at least one of:
    a light detection and ranging (LIDAR) sensor;
    a radar sensor; or
    an ultrasonic sensor.

12. A method, comprising:
    causing a sensor to obtain sensor data at a first time, wherein:
       the sensor obtains the sensor data by detecting waves; and
       the sensor is unable to generate the waves that are detected by the sensor;
    generating a stimulus for the sensor to detect at a second time, wherein the second time is based on the first time and an initiation delay of the sensor;
    receiving the sensor data from the sensor at a third time, wherein the third time is based on the second time and an acquisition delay of the sensor;
    verifying an operation of the sensor based on at least one of the first time, the second time, or the third time; and
    further verifying the operation of the sensor based on that the initiation delay or the acquisition delay is within a corresponding threshold, wherein the sensor is utilized to sense a driving environment during autonomous driving of an autonomous driving vehicle.

13. The method of claim 12, wherein causing the sensor to obtain the sensor data at the first time comprises at least one of:
- transmitting a signal to the sensor; or
- transmitting a message to the sensor, wherein the message indicates that the sensor is to obtain the sensor data.

14. The method of claim 12, wherein generating the stimulus for the sensor to detect comprises:
- generating the stimulus for a period of time starting at the second time, wherein the period of time is determined based on data acquisition characteristics of the sensor.

15. The method of claim 12, wherein verifying the operation of the sensor comprises:
- determining whether a data acquisition delay of the sensor is less than or equal to a threshold acquisition delay based on the second time and the third time.

16. The method of claim 12, wherein verifying the operation of the sensor comprises:
- determining whether an initialization delay is less than or equal to a threshold initialization delay based on the first time and the second time.

17. The method of claim 12, wherein verifying the operation of the sensor comprises:
- determining whether a difference between the first time and the third time is less than a threshold time.

18. The method of claim 12, further comprising:
- generating a timing signal; and
- providing the timing signal to at least one of the sensor or a detector.

19. The method of claim 18, wherein the sensor data comprises a timestamp determined by the sensor based on the timing signal.

20. A non-transitory machine-readable medium having instructions stored therein, which when executed by a processor, cause the processor to perform operations, the operations comprising:
- causing a sensor to obtain sensor data at a first time, wherein the sensor obtains the sensor data by emitting waves towards a detector;
- determining that the detector has detected the waves at a second time, wherein the second time is based on the first time and an initiation delay of the sensor;
- receiving the sensor data from the sensor at a third time, wherein the third time is based on the second time and an acquisition delay of the sensor;
- verifying an operation of the sensor based on at least one of the first time, the second time, or the third time, and further verifying the operation of the sensor based on that the initiation delay or the acquisition delay is within a corresponding threshold.

* * * * *